United States Patent [19]
Stanley

[11] 3,748,426
[45] July 24, 1973

[54] MEANS FOR WELDING PIPE SECTIONS
[75] Inventor: Richard Carl Stanley, Tulsa, Okla.
[73] Assignee: Midwestern Specialties, Ltd., Tulsa, Okla.
[22] Filed: Aug. 2, 1971
[21] Appl. No.: 168,078

Related U.S. Application Data
[62] Division of Ser. No. 778,416, Nov. 25, 1968, Pat. No. 3,681,560.

[52] U.S. Cl............... 219/60 A, 219/125 R, 228/45
[51] Int. Cl............................................. B23k 9/02
[58] Field of Search............ 219/60 A, 60 R, 125 R, 219/125 PL, 158, 159, 161; 228/45, 44, 50; 29/493, 200

[56] References Cited
UNITED STATES PATENTS
3,135,850   6/1964   Scheller et al..................... 219/60 A
3,207,881   9/1965   Pagan .............................. 219/60 A
3,084,244   4/1963   Rieppel et al..................... 219/60 A Primary Examiner—J. V. Truhe
Assistant Examiner—L. A. Schutzman
Attorney—William S. Dorman

[57] ABSTRACT

A method and means of welding adjacent pipe sections in tandem relation at the installation site for the pipe line. An internal clamping apparatus simultaneously engages the inner periphery of adjacent pipe ends in such a manner as to apply radially outward pressure thereto for reforming the ends into substantially identical circular configurations, regardless of any existing deformation in the pipe. The two reformed pipe ends are securely retained in an abutting position by the clamping means during the entire welding operation. An external welding apparatus is secured around the outer periphery of the pipe in the proximity of the abutting pipe ends for providing a circumferential weld at the pipe joint. The welding apparatus includes a pair of independently movable carriages, with each carriage being provided with a plurality of welding heads for performing simultaneous but sequential welding operations. One of the carriages moves from a position corresponding to 0° through a distance of substantially 180° around the circumference of the pipe while the other of the carriages moves around the circumference first from a position of 270° to 180° and then from 360° back to 270° whereby the welding operation is performed in a balanced manner around the entire circumference of the pipe joint. The welding heads of each carriage perform simultaneous welding operations, with the welding head performing a first welding operation at the pipe joint, and the next succeeding welding head tracking the movement of the first welding head and performing a second welding operation at substantially the exact optimum time interval between the two welding steps to assure an efficient welding of the joint. It is preferable to provide three of the welding heads on each carriage. However, it has also been found that two welding heads on each carriage perform an efficient total welding operation. Subsequent to the welding of the pipe joint, the internal clamping apparatus and external welding apparatus may be moved longitudinally along the pipe line to the position of the next pipe joint to be welded, and the entire operation may be repeated.

8 Claims, 22 Drawing Figures

INVENTOR.
RICHARD C. STANLEY

BY William S. Dorman

ATTORNEY

INVENTOR.
RICHARD C. STANLEY
BY William S. Dorman
ATTORNEY

INVENTOR.
RICHARD C. STANLEY

BY William S. Dorman
ATTORNEY

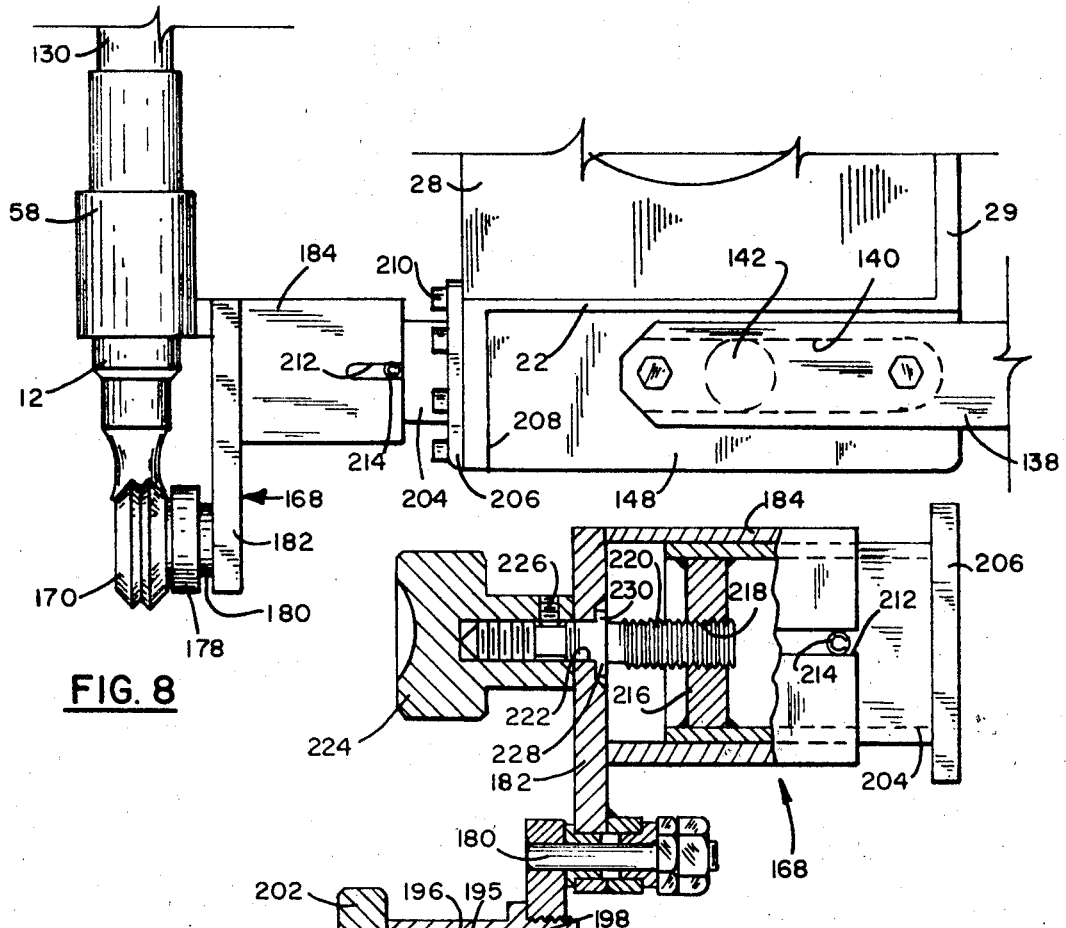
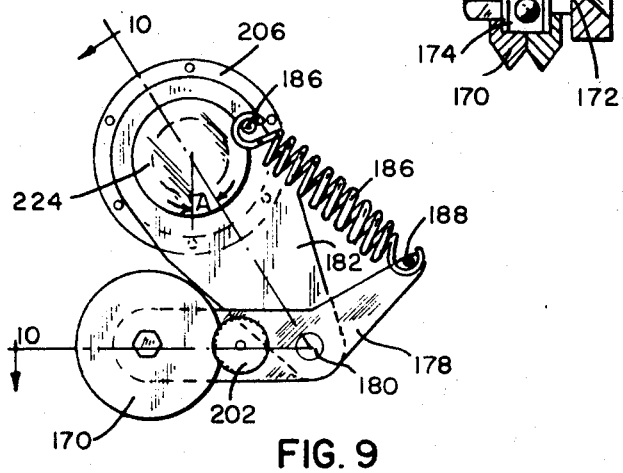

INVENTOR.
RICHARD C. STANLEY

INVENTOR.
RICHARD C. STANLEY

BY William S. Dorman

ATTORNEY

MEANS FOR WELDING PIPE SECTIONS

This application is a division of my co-pending application Ser. No. 778,416, filed Nov. 25, 1968, now U.S. Pat. No. 3,681,560, issued Aug. 1, 1972.

This invention relates to improvements in pipe welding method and means and more particularly, but not by way of limitation, to a novel method and means for internal clamping of adjacent pipe ends and external circumferential welding of the pipe joint.

Pipe lines normally extend throughout relatively long distances and across terrain which is often remote. In the usual construction of a pipe line, a plurality of pipe sections are initially disposed in tandem relation, and the adjacent ends of the pipe sections are placed in abuttment and welded together. Of course, it is important that the welded joints be of an extremely high quality to assure an efficient handling of the products transported thereby, and to increase the life of the pipe line while reducing maintainence thereof. The welding of the pipe joints in the field has long been a problem in the industry, and much time and expense has been involved in an effort to solve the problem.

The present invention contemplates an improved method and means for welding pipe joints in the field, and includes two complementary overall steps for providing the increased welding efficiently at each joint. First, an internal pipe clamping apparatus has been particularly designed and constructed for simultaneously applying radially outward pressure on each of the abutting pipe ends for restoring a substantially true circular configuration for the pipe ends to be united or welded. The clamping apparatus forms the pipe ends into a substantially identical configuration and securely holds the ends so formed in an efficient abutting position during the welding operation. An external welding apparatus is then utilized for providing a circumferential welding operation around the joint determined by the abutting pipe ends. The welding apparatus is provided with a pair of carriages independently movable around the circumference of the pipe. Each carriage is provided with a plurality of aligned welding heads so mounted on the respective carriage whereby one of said heads applies an initial layer or welding material in the pipe joint, and the next succeeding welding head applies the next succeeding layer of welding material on the first applied layer, with the time interval between the two layers being at the optimum for assuring an efficient overall welding operation.

In addition, each of the carriages move separately about the circumference of the pipe for performing simultaneous welding operations at different positions in the pipe joint. One of the carriages initially is positioned at 0° and moves around the circumference to a position of approximately 180° during the welding operation. Simultaneously, the second carriage is initially positioned at 270° and moves around the pipe to a position of 180° during the welding operation, then quickly moves to the 360° and again begins the welding operation while moving from 360° back to the initial 270° position. This results in a complete circumferential weld at the pipe joint, and efficiently balances the welding apparatus at all times.

The unwelded pipe joint is usually in the form of a V-shaped circumferential groove between the abutting ends of the pipe sections and the welding operation fills the groove with welding material for uniting the pipe sections. Each of the welding heads may be independently oscillated during the welding operation for increasing the overall results of the apparatus and method. The welding head providing the first "pass" or application of welding material in the bottom of the groove is oscillated in a relatively slight movement whereas the next succeeding welding head is oscillated in a greater movement. Each welding head may be suitably adjusted whereby the oscillation thereof will be at the optimum in accordance with the particular welding requirements thereof. In addition, the plane of the weld groove may not be exactly perpendicular to the longitudinal axis of the pipe, or indeed, may deviate from any plane surface at all. In order to overcome this disadvantage, a guide wheel is provided which rolls along or rides in the groove and maintains the welding heads in alignment with the groove regardless of irregularities in the path of the groove. Subsequent to the completion of the welding at one pipe joint, the clamping apparatus and welding apparatus may be moved longitudinally through and along the pipe to the next pipe joint and the operation may be repeated.

The resulting welded joint accomplished through the method and means of the present invention have proven to be excellent. X-ray inspection has shown the welded joints are substantially free from holidays and sections cut through the material of the weld and adjacent material of the pipe sections have shown an excellent quality in the resulting weld. It is to be noted that the superior clamping method and means for reforming the adjacent pipe ends and aligning and clamping the pipe ends in abutting relationship prior to and during the welding operation are an important step in the overall results obtained in the final welding operation. Any misalignment of the abutted pipe ends or any nonconformity therebetween would decrease the end result of the welding operation. Thus, the novel and increased efficiency of results possible through practice of the present invention include the combined steps of performing the pipe ends into a substantially circular configuration by the internal clamping means, efficient aligning and clamping the abutting pipe ends prior to and during the welding operation, and performing the external welding operation by simultaneously and sequentially welding the joint in separate welding layers or operations while passing a plurality of welding heads circumferentially around the pipe joint. The novel method and means for welding pipe sections is simple and efficient in operation and economical and durable in construction.

It is an important object of this invention to provide a novel method and means for welding pipe joints which provides an optimum weld at the pipe joint in an efficient and economical manner.

Another object of this invention is to provide a novel method and means for welding pipe joints wherein the adjacent pipe ends to be welded are initially formed into substantially true mating circular configurations for improving the overall welding results.

It is another object of this invention to provide a novel method and means of welding a pipe joint wherein the welding operation is accomplished by a multiple step welding process with each welding step being accomplished in a sequential and simultaneous relationship with the other welding steps.

A further object of this invention is to provide a novel method and means of welding a pipe joint wherein the welding operation is accomplished through sequential and simultaneous operation of independent welding heads, with each welding head being independently oscillated in accordance with the desired performance thereof for increasing the overall welding results.

Still another object of this invention is to provide a novel method and means of welding a pipe joint wherein the welding heads are maintained in substantial alignment with the weld groove during the welding operation.

A still further object of this invention is to provide a novel method and means of welding a pipe joint wherein the abutting pipe ends are securely clamped and aligned prior to and during the welding operation.

It is a still further object of this invention to provide a novel method and means of welding a pipe joint wherein two sets of welding heads are independently moved circumferentially around the pipe joint for performing the welding operation in a balanced welding operation.

Other and further objects and advantageous features of the present invention will hereinafter more fully appear in connection with a detailed description of the drawings in which:

FIG. 8 is an enlarged elevational view particularly depicting the guide wheel means in association with a welding head.

FIG. 9 is an elevational view of the yieldable attaching means for the guide roller of the welding apparatus.

FIG. 10 is a sectional view taken on line 10—10 of FIG. 9 depicting the adjusting arrangement for the guide roller mechanism of the welding apparatus.

Figure 1:
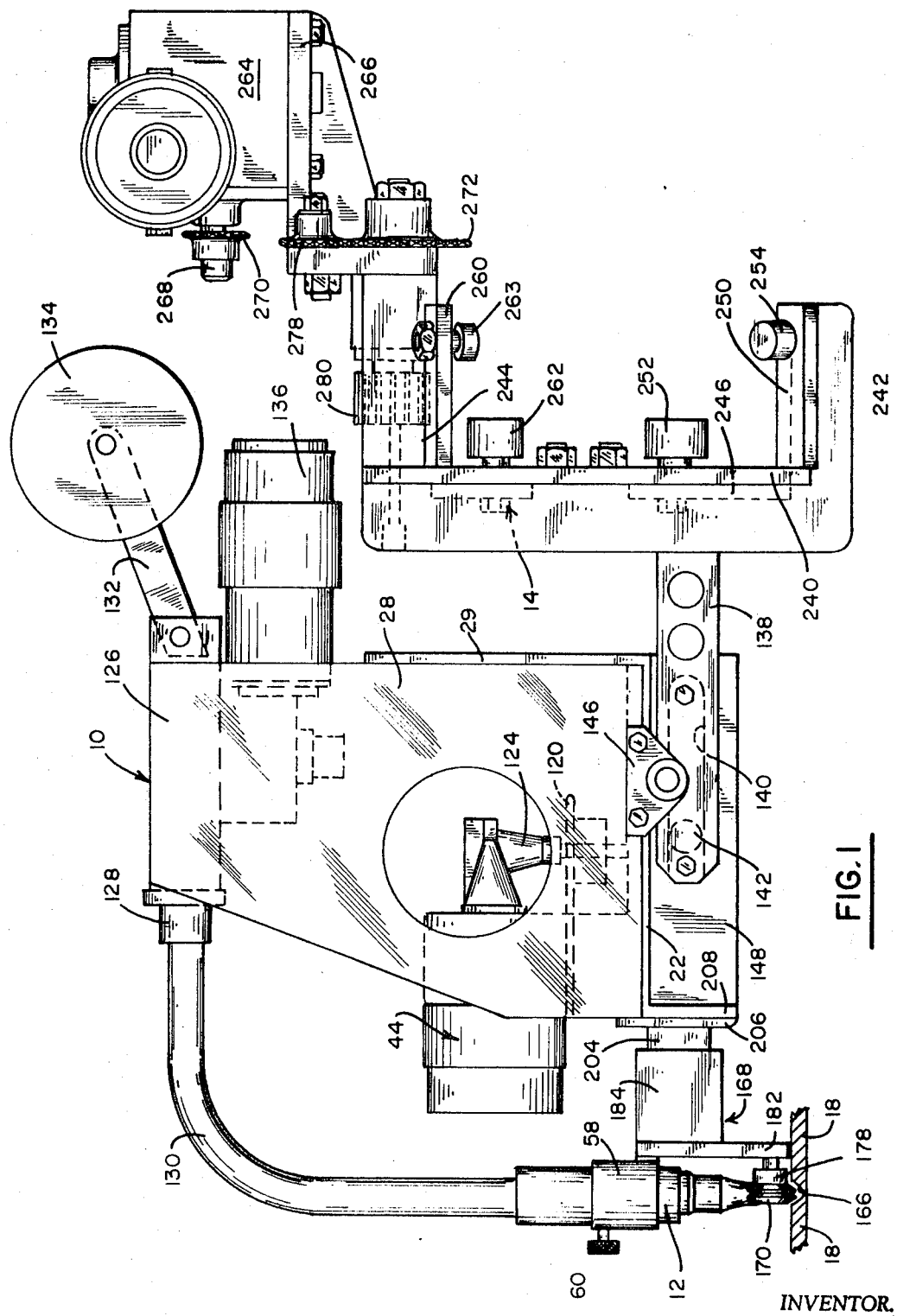
FIG. 1 is a side elevational view of a pipe welding apparatus embodying the invention.

Referring to the drawings in detail, and particularly FIGS. 1 through 13, an external pipe welding apparatus in generally indicated at 10 which comprises a plurality of welding heads 12 adjustably mounted on a carriage device 14 in a manner as will be hereinafter set forth. The carriage device 14 is movably secured or mounted on a circular or annular track 16 which encircles a pipe section 18, or other tubular member, or the like. The track 16 is carried by or secured to a saddle member 20 which straddles a portion of the outer periphery of the pipe 18 and secures the track 16 thereon in a manner precluding rotation of the track 16 with respect to the longitudinal axis of the pipe 18. The carriage 14 moves or is propelled around the track 16 during a pipe joint welding operation for moving the welding heads 12 around the pipe for providing a circumferential, in place, welding operation, as will be hereinafter set forth.

Figure 2:
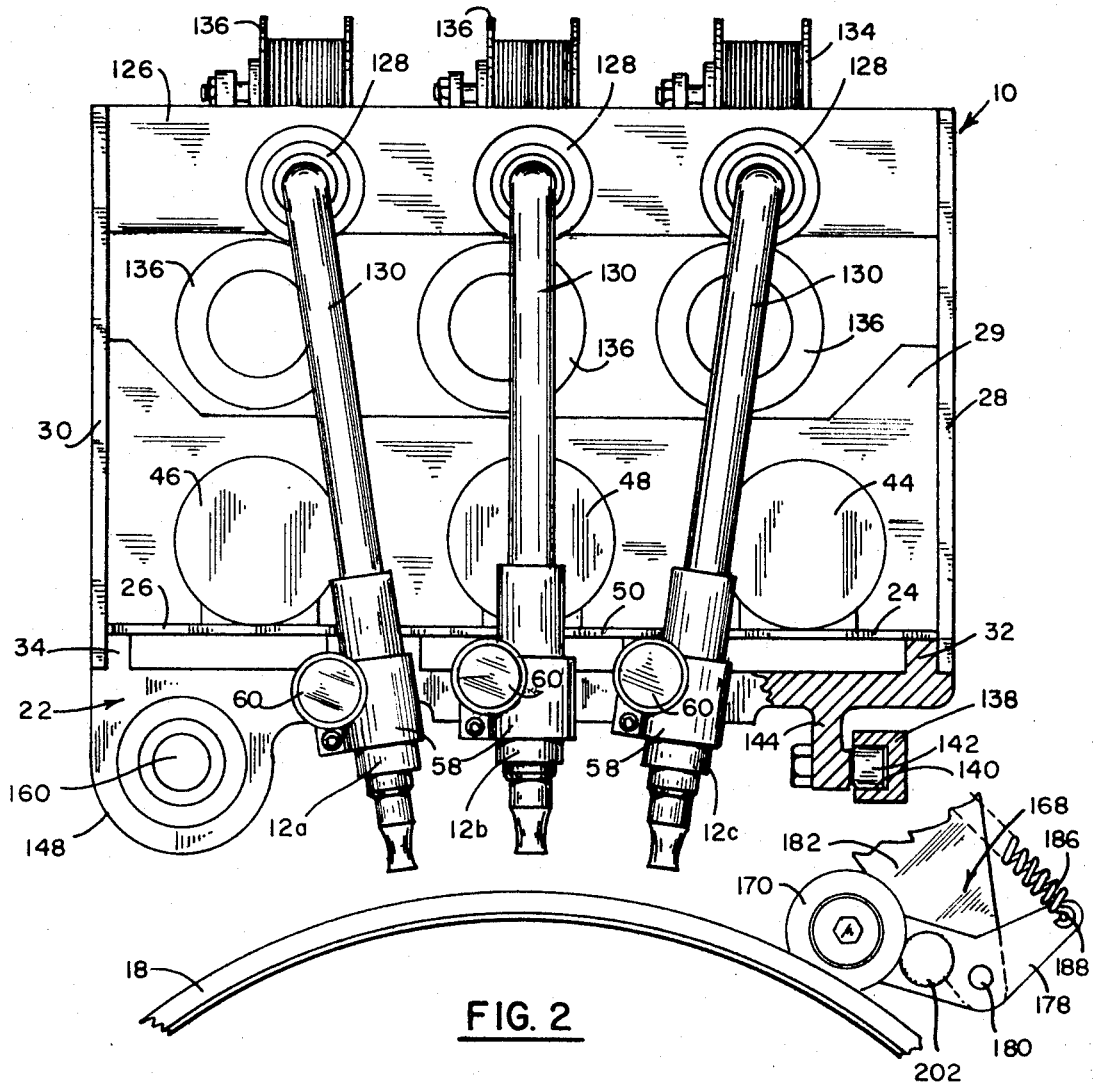
FIG. 2 is a front elevational view of a pipe welding apparatus embodying the invention with certain portions eliminated for purposes of illustration.

The pipe welding apparatus 10 as depicted herein preferably comprises three welding heads 12a, 12b, and 12c, as particularly shown in FIG. 2. However, it is to be noted substantially any desired number of welding heads may be used. By way of example, an efficient welding operation has been performed utilizing two welding heads following the same general procedure as will be hereinafter set forth. The welding heads 12a, 12b, and 12c may be of any suitable type and as shown herein are of the MIG (metallic inert gas) type.

The welding heads 12 are each independently mounted on a base member generally indicated at 22 whereby the position of each welding head 12 may be independently adjusted and each head 12 may be independently oscillated during the welding operation for a purpose and in a manner as will be hereinafter set forth. The base 22 is bolted or otherwise secured to a pair of shoulder blocks 24 and 26 which are suitably secured to the inner faces of a pair of spaced side plates 28 and 30 having a rear or back filler plate secured therebetween. The shoulder blocks 24 and 28 extend inwardly from the side plates 28 and 30 as particularly shown in FIG. 5 and the base 22 is provided with upstanding boss or flange portions 32 and 34 extending along the opposite edges thereof as viewed in FIG. 7 whereby bolts or the like 36 may be utilized for securing the base 22 to the shoulders 24 and 26 and between the side plates 28 and 30. In addition, a pair of spaced upwardly extending block members 38 and 40 are provided on the upper surface of the base member 22 as viewed in FIGS. 5 and 7 whereby bolts 42 or the like, may be utilized for facilitating securing of the base 22 to the shoulders 24 and 28. The shoulders 24 and 26 each support a suitable control motor 44 and 46 respectively and a third similar control motor 48 is interposed therebetween and supported on a plate 50 which is bolted or otherwise secured on the blocks 38 and 40, such as by the bolts 52. The motors 44, 46, and 48 may be of any suitable type and are preferably a Boehm control motor which is utilized for oscillating the welding heads 12 as will be hereinafter set forth.

Figure 7:
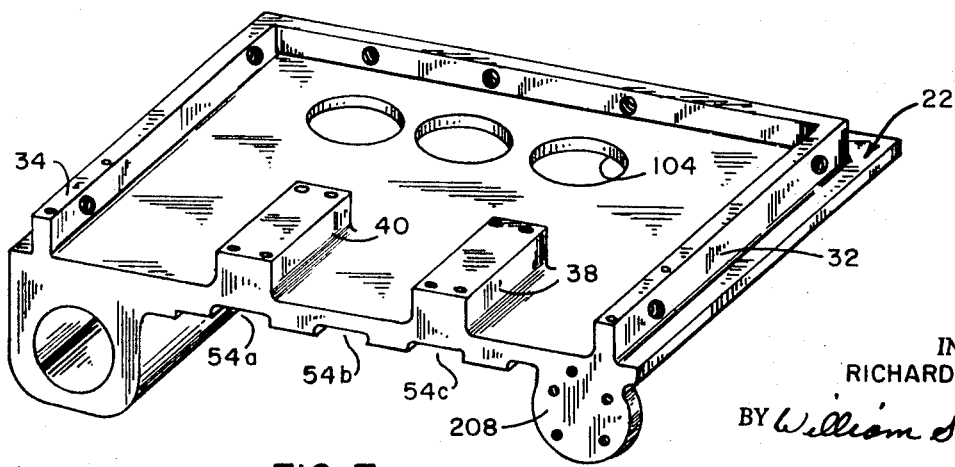
FIG. 7 is a perspective view of a support base member utilized in the invention.

The base 22 is provided with a plurality (preferably three) of recesses 54a, 54b, and 54c as particularly shown in FIG. 7 disposed in substantial alignment with the welding heads 12a, 12b, and 12c, respectively, the recesses 54a, 54b, and 54c being provided for slidably receiving the welding head support apparatus 56 of the respective welding head. Each support member 56 for the welding heads 12 is substantially identical and only one of the support structures 56 will be set forth in detail herein. Whereby the welding heads 12 may be adjustably secured to the base 22 in any suitable manner, the securing device 56 depicted herein comprises a substantially tubular split nozzle clamp 58 adapted to be secured around the welding head or welding nozzle 12. A radially outwardly projected rod or arm member 62 is carried by the clamp 58 and extends from the clamp 58 into connection with a sliding block member 64. The sliding block member 64 is provided with a transversely extending recess 66 for receiving a complementary flange member 68 provided on a substantially L-shaped bracket member 70. The sliding block 64 may be positioned with respect to the flange 68 as desired for locating the lateral position of the respective welding head 12 with respect to the pipe 18 and the block 64 may then be securely locked in position by means of a cap screw 72 or the like which extends through the bracket 70 and into engagement with the block 64.

A rod member 74 is secured to the bracket 70 and is journalled within an oscillator clamping bracket 76. The bracket 76 is preferably of the split sleeve type and may be secured around the rod 74 by means of the screws 78 or the like. A plate member 80 is secured to the upper end or upper portion of the clamp 76 as viewed in FIG. 6 and is suitably disposed within longitudinally extending grooves or recesses (not shown) provided in downwardly extending blocks or hanger members 82 which are secured in the opposite longitudinal side walls of the respective recess 54. The blocks or hangers 82 are preferably constructed from Micarta and may be secured within the respective recess 54 in any suitable manner such as by bolting or the like and the plate 80 is longitudinally slidable with respect thereto. The rod 74 may be pivotally adjusted within the clamp member 76 to provide the desired angular position for the respective welding head 12 with respect to the pipe 18 and the rod 74 may then be securely clamped in the selected position by the screw member 78 as is well known.

Figure 6:
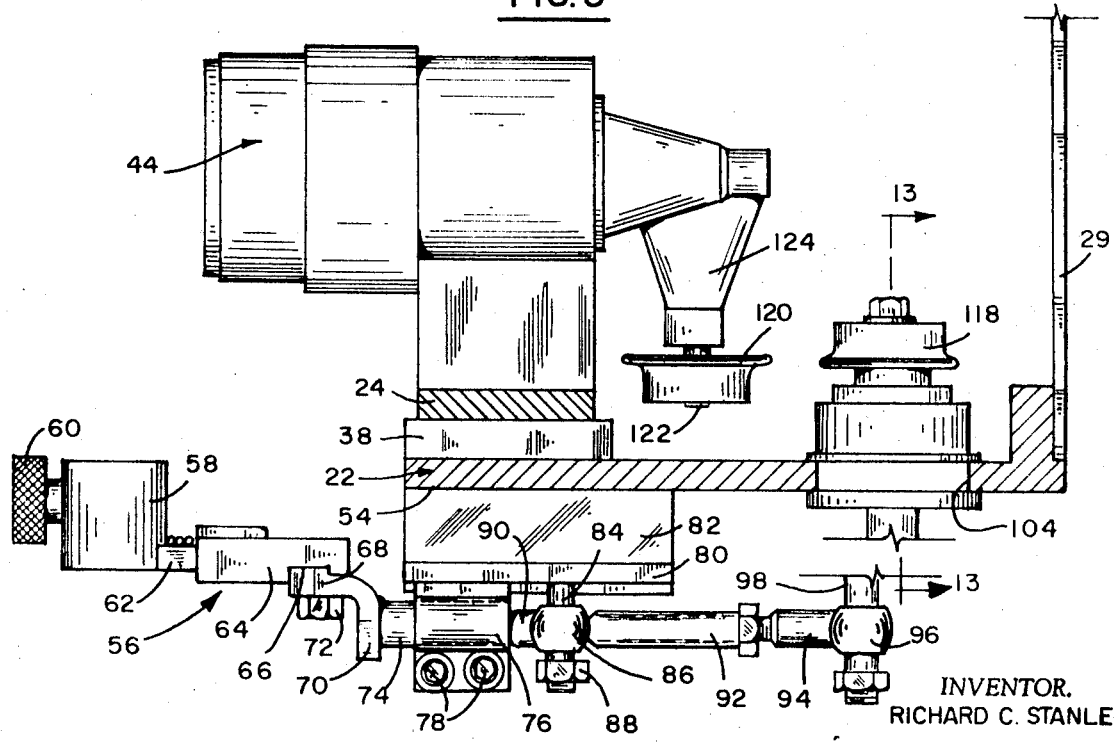
FIG. 6 is a side elevational view of a portion of the support structure shown in FIG. 5 and particularly indicates the adjusting mechanism for the welding apparatus.
Figure 11:
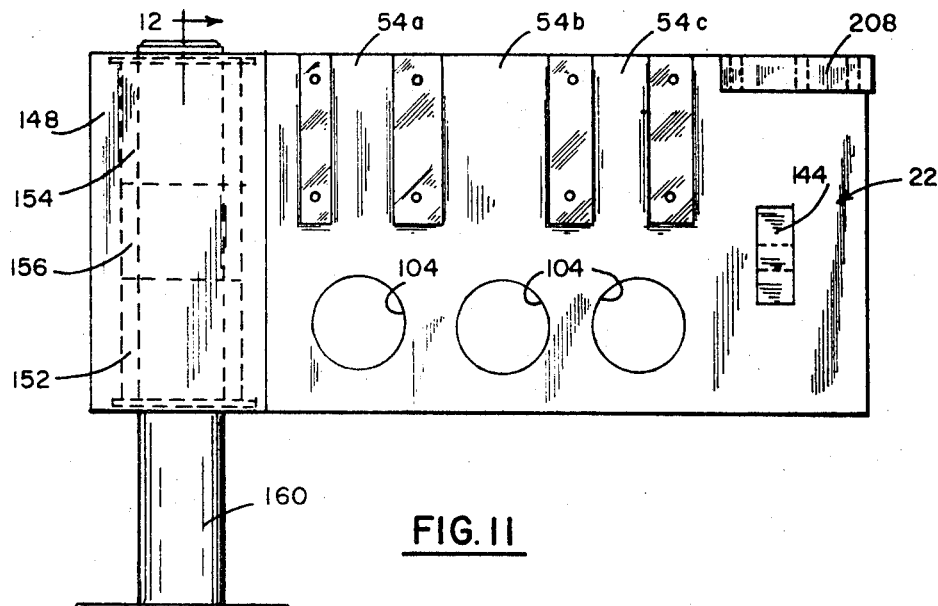
FIG. 11 is a bottom view of a support member of the welding apparatus.
Figure 12:
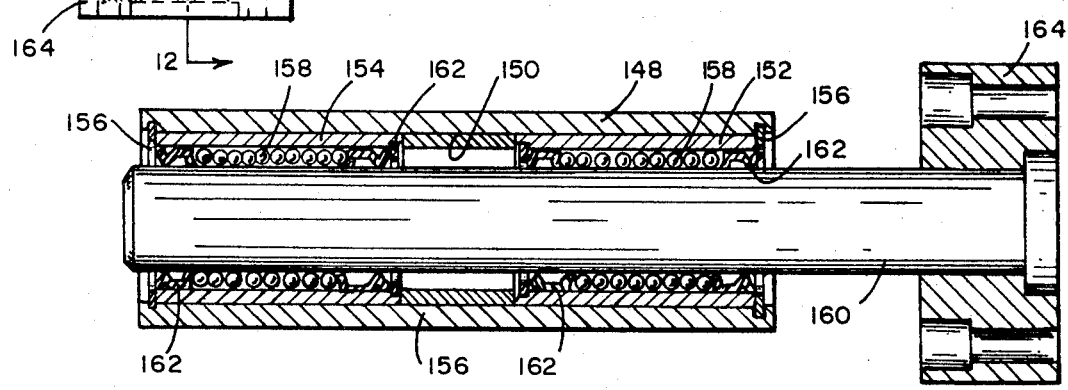
FIG. 12 is a sectional view taken on line 12—12 of FIG. 11.
Figure 13:
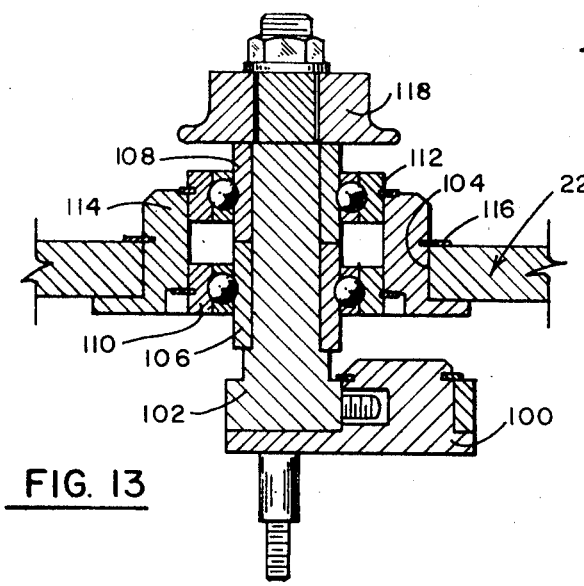
FIG. 13 is an enlarged sectional view taken on line 13—13 of FIG. 6.

A rod 84 is carried by the plate 80 and extends downwardly therefrom as viewed in FIG. 6. A substantially spherical ball joint member 86 is journalled on the rod 84 and a nut 88 is threadedly secured to the outer extremity of the shank 84 for precluding accidental loss of the ball joint 86. A projection member 90 extends from the ball joint into engagement with the opposite end of the rod 74. An internally threaded sleeve 92 bears against the outer periphery of the ball joint 86 or is suitably connected thereto and extends in a direction away from the rod 84 which is opposite from the heads 12. A threaded insert member 94 extends into the sleeve 92 and is carried by a substantially spherical ball joint 96. The ball joint 96 is journalled on a crank pin member 98 which is carried by a crank arm follower 100 (FIG. 13) which in turn is carried by a crank shaft 102 which extends through an aperture 104 provided in the base member 22. The crank shaft 102 may be journalled within the aperture 104 in any suitable manner and is shown in FIG. 13. A pair of aligned bushing sleeves 106 and 108 are disposed around the outer periphery of the crank shaft 102 and provide an inner race for a pair of suitable spaced ball bearings 110 and 112 which are disposed within a flanged sleeve 114 secured within the aperture 104 by a lock washer 116.

A suitable sprocket 118 is keyed or otherwise secured to the upper end of the crank shaft 102 as viewed in the drawings for transmitting rotation to the crank shaft. Whereas the sprocket may be of any suitable type, it is preferable to provide a single structure sprocket complementary to a similar sprocket 120 secured to a rotatable drive shaft 122 which extends from a suitable gear boss 124 wherein the drive shaft 122 is coupled with the drive shaft (not shown) of the motor 44 whereby the drive shaft 122 will be driven or rotated by the motor 44. Rotation is transmitted from the sprocket 120 to the sprocket 118 by a suitable chain, belt, or the like (not shown) as is well known. Upon actuation of the motor 44, rotation is transmitted from the sprocket 120 to the sprocket 118 for rotating the crank shaft 102 whereby the crank pin 98 is rotated in a cam action as is well known for transmitting oscillatory or reciprocal motion to the plate 88 through the connection members 94, 92, and 88. Of course, the length of the stroke or oscillatory movement of the plate 80 may be adjusted by the threaded connection between the sleeve 92 and pin 94. This oscillatory motion is transmitted to the clamping member 58 and, of course, to the welding head 12 carried thereby. It will be apparent that the frequency and magnitude of the oscillation of each welding head 12 may be independently adjusted to provide the optimum welding operation in a sequential welding process as will be hereinafter set forth.

Referring now to FIGS. 1 and 2 a motor mounting bracket 126 is secured between the side plates 28 and 30 and is provided with a suitable wire guide connector bracket or block 128 for each welding head 12. The connector bracket 128 is preferably the well known or standard Airco connector block whereby the usual curved arcuate wire guide tubing 130 may be secured or connected between the welding head nozzles and the respective connector blocks. A connecting arm 132 is suitably secured to the bracket 126 in association with each connector block 128 and extends in opposite directions therefrom for rotatably supporting a wire spool assembly 134 whereby welding wire may be directed from the spool 134 through the connector blocks 128 and through the welding tube guide 130 to the welding nozzles as is well known. In addition, a suitable motor 136 is mounted on the mounting bracket 126 in association with each wire spool assembly 134 for driving or feeding the wire to the welding nozzles during a welding operation, as is well known. Of course, the motors 136 may be of any well known type, and as shown herein are preferably of the type known as a Boehm wire feed motor.

The base 22 is movably secured to the carriage device 14 whereby the base 22 and elements carried thereby may be adjusted to substantially any desired spacing from the carriage 14. An arm member 138 is provided on the carriage device 14 and extends outwardly therefrom in a direction toward the base 22, as particularly shown in FIG. 1. The arm 138 is provided with an elongated cam recess 140 for receiving a roller member 142 therein, said roller 142 being journalled in a downwardly extending flange 144 provided on the lower surface of the base 22 as viewed in FIGS. 2 and 5. The roller member 142 normally rides freely within the recess 140 and may be securely locked in substantially any desired position therein by any suitable locking means, such as by the locking means generally indicated at 146 in FIG. 1 for locking the assembly 10 during shipping or transporting of the device between joints to be welded.

A downwardly extending boss 148 is provided on the lower surface of the base 22 as viewed in the drawings, and extends along the side edge thereof oppositely disposed from the arm 138. The boss 148 is provided with a centrally disposed bore 150 extending longitudinally therethrough as particularly shown in FIGS. 11 and 12. A plurality of spaced bushing or bearing sleeves 152 and 154 are disposed within the bore 150 and are preferably spaced apart by a spacer sleeve 156, and retained within the bore 150 by suitable lock washers 158, or the like, as is well known. A plurality of balls 158 are disposed within each sleeve 152 and 154 and are interposed between the sleeves 152 and 154 and a slidable shaft 160 extending longitudinally through the sleeves. The balls 158 are retained in position in any well known manner, such as by the retainer rings 162. An enlarged head member 164 is secured to the outer end of the shaft 160 and is bolted, or otherwise secured to the carriage device 14, and remains immovable with respect thereto. It will be apparent that the boss 148 is freely slidable along the shaft 160, thus facilitating moving of the base 22 in directions toward or away from the carriage device 14.

Figure 22:
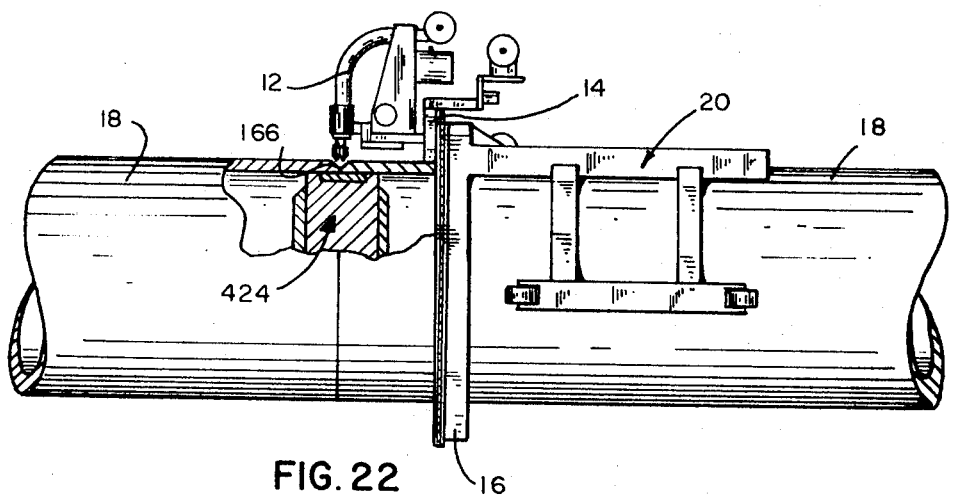
FIG. 22 is an elevational view of a pipe joint with a schematic depiction of an internal clamping apparatus, an external welding apparatus in association therewith embodying the invention.

A pipe joint to be welded, such as shown at 166 in FIGS. 1 and 22, is formed between the abutting ends of adjacent pipe sections 18 disposed in substantial longitudinal alignment. The ends of the pipe sections 18 are normally bevelled, as is well known, and the cross sectional configuration of the pipe joint 166 is usually substantially V-shaped, as depicted herein. Referring now to FIGS. 1, 2, 8, 9, and 10, a guide roller assembly generally indicated at 168 is carried by the base member 22 and comprises a guide roller or wheel member 170 having an outer periphery of a configuration generally complementary to the cross-sectional configuration of the pipe joint 166. The guide roller or wheel 170 is provided for riding in the pipe joint 116 during a pipe welding operation for automatically retaining the welding heads 12 in alignment with the pipe joint for assuring an efficient welding operation in a manner as will be hereinafter set forth. The roller 170 is journalled on a shaft or pin 172 in any suitable manner, such as by a roller bearing 174, and is retained on the shaft 172 by a lock nut 176, or the like. The pin 172 is suitably secured to a guide arm 178 which is preferably of an angular configuration as particularly shown in FIGS. 2 and 9 to provide a substantially bell crank action for the support of the roller 170.

The guide arm 178 is pivotally secured at 180 to an arm retainer plate 182, with the pivot point 180 providing a fulcrum for the arm 178. The retainer plate 182 is carried by a sleeve or tubular member 184, and is rigidly secured thereto in any well known manner. Upon assembly of the guide roller mechanism 168, the retainer plate 182 is preferably disposed at an angle of approximately 30 degrees with respect to the center line of the pipe as incidated at A in FIG. 9. A pin 184 is secured to the exposed surface of the retainer arm 182 and extends substantially perpendicularly outward therefrom for receiving one end of a suitable compression spring 186. The opposite end of the spring 186 is anchored at a second pin 188 provided on the exposed face of the arm 178. The spring 186 constantly urges the arm 178 in a counterclockwise direction about the fulcrum 180, as viewed in FIG. 9, and thus constantly urges the wheel 170 in a direction toward the pipe joint 166 in which it is exposed.

A locking pin 190 is slidably disposed within the central bore 192 of a pin housing 194 which is threadedly secured to the arm 178 as shown in FIG. 10. The bore 192 is enlarged at 195 to provide a shoulder 196 whereby a helical spring 198 is disposed around the pin 190 is contained between the shoulder 196 and an annular shoulder 200 on the pin 190 and thus constantly urges the pin 190 in a right hand direction as viewed in FIG. 10. A head member 202 is secured to the left hand end of the pin 190 as shown in FIG. 10 for limiting the right hand movement of the pin 190. In addition, the head 202 may be manually grasped for moving the pin 190 in a left hand direction against the action of the spring 195. When it is desired to release the engagement of the guide wheel 170 with the pin joint 166, the pin 190 may be retracted within the bore 192 and the arm 178 may be pivoted in a clockwise direction as viewed in FIG. 9 whereby the pin 190 will be moved into alignment with a bore or recess (not shown) provided in the retainer 182. The pin 190 may be disposed within the recess for locking the wheel 170 in a position out-of-engagement with the pipe joint. This is particularly advantageous when the pipe welding apparatus 10 is to be moved from the site of one pipe joint 166 to the site of another pipe joint 166, as will be hereinafter set forth.

The sleeve or tube member 184 is slidably disposed on a tube 204 in a manner as will be hereinafter set forth. The tube 204 is provided with an outwardly extending circumferential flange member 206 on the outer end thereof. The flange 206 is secured in any well known manner, such as the bolts 210, to a substantially circular flange member 208 provided integral with or rigidly secured to the base 22. The sleeve 184 is provided with at least one longitudinally extending in the side wall thereof having one end open for receiving a guide pin 214 therein. The pin 214 is carried by the inner sleeve 204 and cooperates with the slot 212 for facilitating reciprocal movement of the outer sleeve 182 with respect to the inner sleeve 204.

A web member 216 is rigidly secured within the inner sleeve 204 and is provided with a central threaded bore 218 for receiving a threaded stud member 220 therethrough. The stud member 200 extends outwardly through an aperture 222 provided in the retainer arm 182 and is rigidly connected with a suitable knob member 224 by a set screw 226, or the like. An outwardly extending circumferential flange 228 is provided on the stud member 220 and is interposed between the knob member 224 and the threaded end portion for engaging an annular shoulder 230 provided conterminous with the bore 222 whereby the stud member 220 may be rotated upon manual rotation of the knob 224, but is retained against longitudinal movement with respect to the outer sleeve 184 by the engagement of the shoulder 22 and flange 228, and further by the engagement of the knob 224 with the outer face of the retainer arm 182. Thus, rotation of the stud 220 in one direction will cause the stud 220 and outer sleeve 184 to move in a right hand direction with respect to the inner sleeve 204 as viewed in FIG. 10, and rotation of the stud 220 in an opposite direction will cause the sleeve 184 to move in a left hand direction with respect thereto. It will be apparent that manual rotation of the knob 224 permits an adjustment of the position of the guide wheel 170 for assuring an alignment of the wheel 170 and the pipe joining 166 during the installation of the pipe welding apparatus 10 at the pipe joint for beginning a welding operation.

Figure 3:
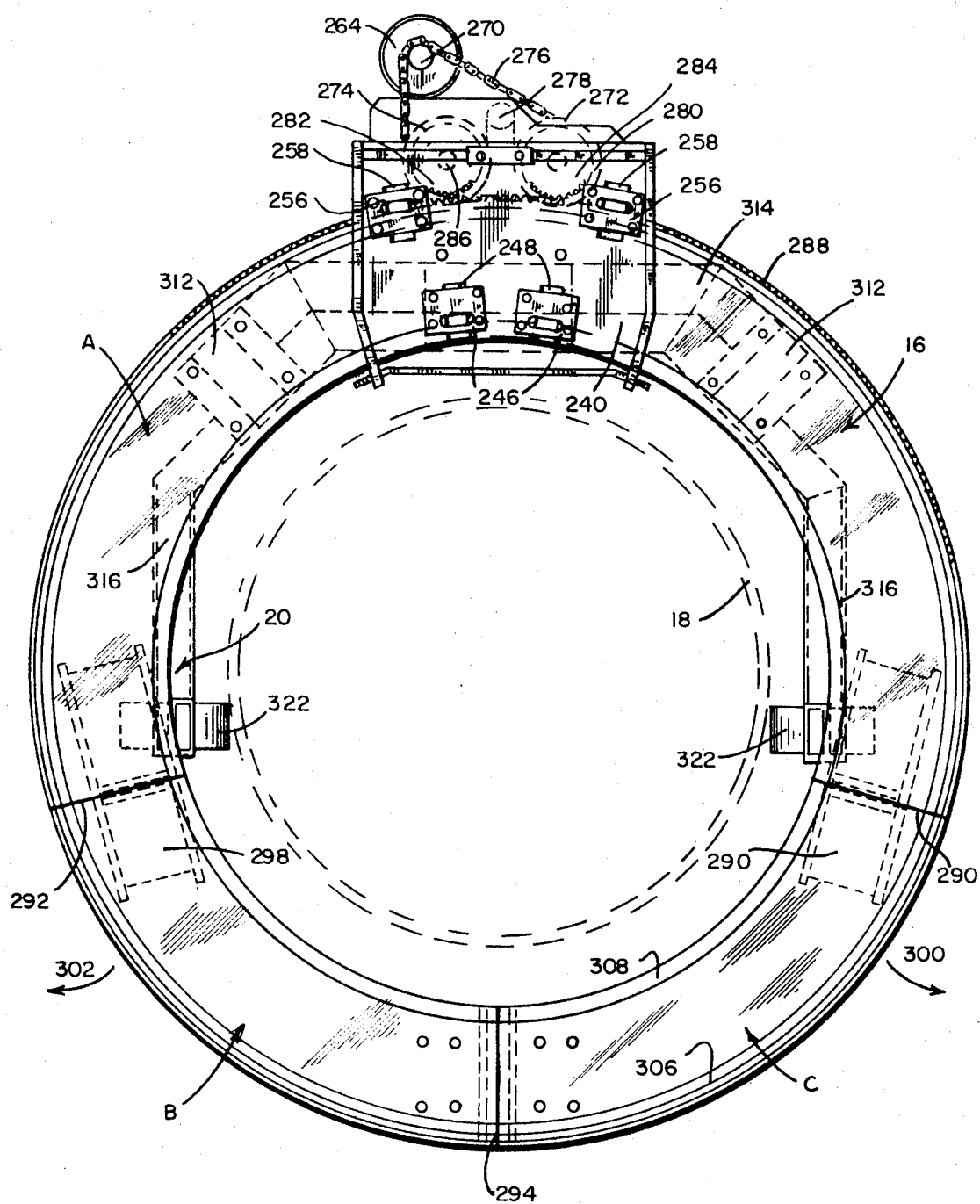
FIG. 3 is a rear elevational view of a pipe welding apparatus embodying the invention and disposed around a pipe section with the pipe being depicted in dotted lines.
Figure 4:
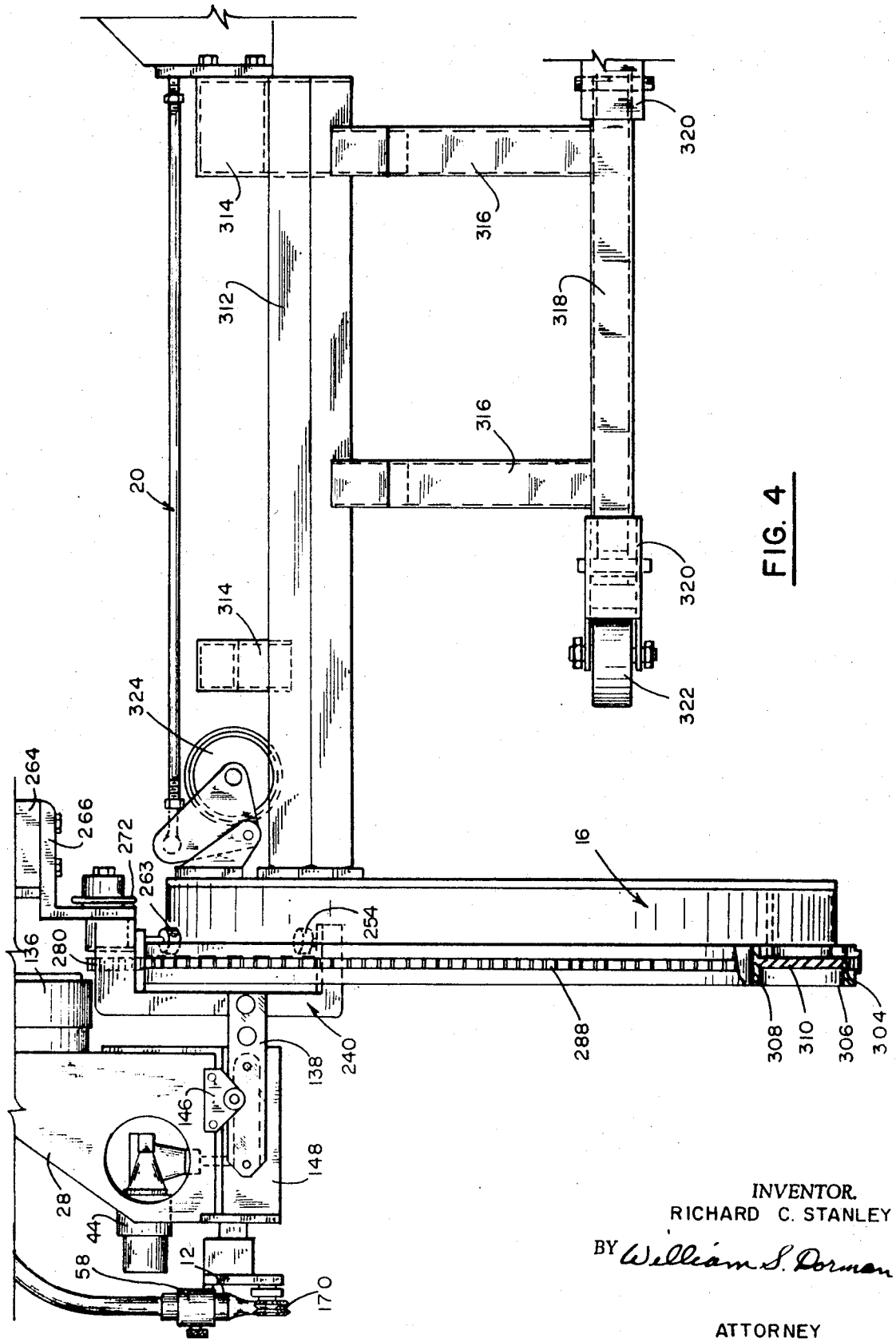
FIG. 4 is a side elevational view of the track and saddle member of a pipe welding apparatus embodying the invention.
Figure 5:
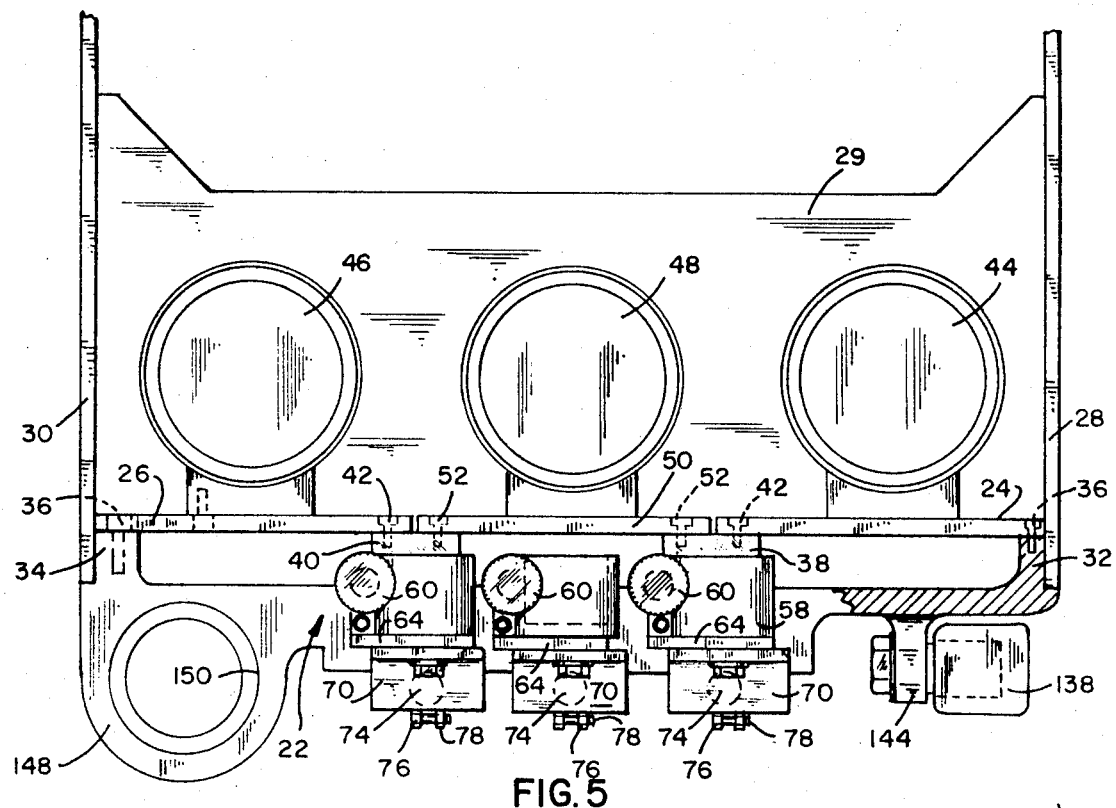
FIG. 5 is a plan view of a portion of the support structure for the welding heads.

Referring now to FIGS. 1, 3, and 4, the carriage device 14 comprises a suitable support plate 240 having a pair of spaced outwardly extending support arms 242 and 244 adapted to span a portion of the track 16 as will be hereinafter set forth in detail. A plurality of bracket members 146 are bolted or otherwise secured to the plate 240 in the proximity of spaced elongated apertures 248 provided in the plate 240 as particularly shown in FIG. 3. Each bracket 246 is provided with an arm member 250 (FIG. 1) which extends through the respective aperture 248. A first roller member 252 is suitably journalled on each bracket 246 and extends through the respective slot 248 for engaging a first cylindrical portion of the track 16. The roller 252 is adjustably secured to the bracket 246 for a purpose as will be hereinafter set forth. A second roller member 254 is suitably journalled on the arm 250 of each bracket 246, with the second roller 254 being disposed in a plane substantially perpendicular with respect to the plane of the first roller 252 whereby the second roller engages an annular portion of the track 16 as will be hereinafter set forth.

A plurality of similar bracket members 256 are bolted or otherwise secured to the plate 240 and spaced from the first brackets 246 as particularly shown in FIG. 3. Each of the brackets 256 is secured in the proximity of spaced apertures 258 provided in the plate 240. Each bracket 256 is provided with an arm member 260 (FIG. 3) which extend through the respective slot 258. A first roller member 262 is journalled on each of the brackets 256 and extends through the respective slot 258 for engagement with a second cylindrical portion of the track 16. The roller 262 is adjustably secured to the bracket 256 for a purpose as will be hereinafter set forth. A second roller 263 is suitably journalled on the arm 260 of each bracket 256, with the plane of the second roller 263 being disposed substantially perpendicular with respect to the plane of the first roller 262 whereby the second roller 263 engages an annular portion of the track 16, as will be hereinafter set forth in detail.

The entire carriage 14 moves circumferentially around the track 16, and as shown herein, a motor 264 is carried by the carriage 14 for providing the power or means for moving the carriage 14 with respect to the track 16. The motor 264 may be of any suitable type, and as shown herein is preferably the Boehm gear motor type. The motor 264 is suitably mounted on a support bracket 266 which in turn is mounted on or secured to the arm 244 of the support bracket plate 240. The output or drive shaft 268 of the motor 264 drives a sprocket member 270 which is connected with a pair of spaced sprockets 272 and 274 by a suitable chain 276, or the like, (FIG. 3) which extends around the outer periphery of the sprocket 270 and the sprockets 272 and 274, and over an adjustable idler sprocket drive gear member 278. The position of the idler sprocket 278 may be adjusted as required for maintaining the proper tension in 276 for efficiently driving or rotating the sprockets 272 and 274.

Each sprocket 272 and 274 is secured to or connected with similar drive gears 280 and 282 through a drive shaft 284 and 286, respectively, whereby rotation of the sprockets 272 and 274 is transmitted to the gears 280 and 282. The gears 280 and 282 are disposed in meshing engagement with a ring gear 288 which extends around the outer periphery of the track 16. Thus, upon rotation of the sprocket 270 by the actuation of the motor 264, the sprockets 272 and 274 will be rotated by the drive chain 276, and rotation will be simultaneously transmitted to the drive gears 280 and 282. The ring gear 288 is integral with or rigidly secured to the stationary track 16, and cannot rotate with respect thereto. Thus, the rotation of the drive gears 280 and 282 which mesh with the ring gear 288 causes the entire carriage device 14 to move circumferentially around the track 16. Of course, the welding heads 12 are thus moved circumferentially around the track 16 and simultaneously moved circumferentially around the pipe 18 for performing a circumferential pipe joint welding operation, as will be more fully set forth in detail hereinafter.

The track 16 is of a generally annular configuration having an inner periphery of a diameter greater than the diameter of the outer periphery of the pipe 18. The track 16 is preferably severed at three spaced locations, as indicated by the lines 290, 292, and 294 in FIG. 3, thus providing three arcuate sections A, B, and C for the track 16. The section A as shown in FIG. 3 is substantially greater in circumferential length than the combined circumferential lengths of the sections B and C, but is not limited thereto. The sections B and C are secured to the opposite ends of the section A by suitable hinge members 296 and 298 whereby the sections B and C may each be pivoted in the direction indicated by the arrows 300 and 302, respectively, for opening of the track 16 to facilitate installation of the device 10 around the pipe section 18. The free ends of the sections B and C meet at the line 294 in the closed position of the track 16, as shown in FIG. 3, and any suitable locking or latching device (not shown) may be bolted across the abutting ends of the sections B and C, or otherwise span the ends of the sections for securely locking the track 16 in position around the pipe 18.

The track 16 may be of any suitable construction, and as shown herein is provided with an enlarged circumferential portion 304 having the ring gear 288 integral therewith or otherwise rigidly secured around the outer periphery thereof. A pair of concentrically arranged inner and outer circular or cylindrical rail members 306 and 308 are provided in the annular member 304 and are open in a direction toward the carriage device 14 for receiving the rollers 252 and 262 therebetween. The rollers 252 bear against the outer periphery of the inner rail 308 and the roller members 262 bear against the inner periphery of the outer rail 306 as the carriage device 14 moves circumferentially around the track 16. Of course, the pressure of the rollers 252 and 262 against the rails 308 and 306, respectively, may be adjusted by adjusting the position of the rollers extending through the respective slots 248 and 258. In addition, an annular wall member 310 extends between the spaced rails 306 and 308, and the rollers 254 and 262 bear against or ride along the right hand surface of the wall 310 as viewed in FIG. 4 as the carriage device 14 moves circumferentially around the track 16. It will be apparent that the rollers 252 and 262 facilitate the circumferential movement of the carriage device 14 around the track 16 and maintain the carriage device 14 in the proper concentric relation in its movement around the track 16. In addition, the rollers 254 and 263 maintain the carrige device 14 against longitudinal or axial movement with respect to the track 16 in one direction and facilitates retaining of the carriage device 14 in position on the track 16.

As particularly shown in FIGS. 3 and 4, the saddle 20 is secured to the track 16 and extends longitudinally outward therefrom in a direction away from the carriage device 14 and welding heads 12. The saddle 20 may be of substantially any suitable well known construction, and as shown herein comprises a plurality of longitudinally extending circumferentially spaced support posts 312 each having one end rigidly secured to the track 16 oppositely disposed from the annular member 304. A plurality of pipe straddling angular strap members 314 are secured between the posts 312 in any well known manner. In addition, a plurality of oppositely disposed downwardly extending side arm supports 316 are secured to the posts 312 and are longitudinally spaced therealong as shown in FIG. 4. A longitudinally extending connecting strap 318 is suitably secured between the outer ends of each adjacent pair of arms 316, and a roller support bracket 320 is secured to the opposed ends of each of the straps 318. A roller member 322 is journalled in each of the brackets 320 and are so arranged as to roll along the outer periphery of the pipe section 18 in a longitudinal direction. A belt or adjustable strap member (not shown) is normally secured between the strap member 318 and around the outer periphery of the pipe 18 extending below and between the straps 318 for securely clamping and retaining the saddle member 20 in position around the pipe 18, as is well known.

It is preferable to provide at least one roller 324 journalled in a bracket 326 which is suitably secured to the track 16, with the roller 324 being so arranged as to ride longitudinally along the outer periphery of the pipe section 18. It is further preferable to provide at least one similar roller (not shown) suitably secured to the outer edge of the straddle strap 314 and arranged for disposition against the outer periphery of the pipe in a manner similar to the roller 324. These rollers are transport rollers and cooperate with the rollers 322 for facilitating moving of the entire device 10 longitudinally along the outer periphery of the pipe 18 for a purpose and in a manner as will be hereinafter set forth.

WELDING APPARATUS OPERATION

When it is desired to weld a pair of adjacent pipe sections 18 in end to end relation, such as at a pipe joint 166, the welding apparatus 10 is disposed on one of the pipe sections 18 in the proximity of the pipe joint to be welded, with the welding heads 12 disposed in substantial alignment with the pipe joint. In order to install the apparatus 10 around the outer periphery of the pipe section 18, it is preferable to open the track 16 by pivoting the track sections B and C in the directions indicated by the arrows 300 and 302 whereby the track may be disposed around the pipe in a transverse direction. The rollers 322 and 325 of the saddle portion 20 rest on the outer periphery of the pipe 18 and support the apparatus 10 from the pipe section in such a manner that the track 16 is substantially concentrically disposed with respect to the pipe section. The track sections B and C may then be pivoted in a reverse direction for closing thereof around the pipe 18, and shown in FIG. 3, and may be latched or securely locked in the closed position.

The carriage device 14 may be secured to the track 16 either prior to or subsequent to securing of the track and saddle around the pipe section, and the position of the rollers 252 and 262 with respect to the rails 308 and 306, respectively, may then be adjusted to assure an efficient contact therebetween. It is preferable to provide two of the carriage devices 14 and associated welding heads 12 on the track 16 with one of the carriages 14 being disposed as shown in FIG. 3, which will be hereinafter referred to as a 0° position, and with the other carriage disposed at substantially 270° position (clockwise) with respect thereto.

The angular disposition of the welding heads 12 of each carriage device 14 with respect to the pipe 18 may be adjusted as desired through the pivotal connection of the rod 74 (FIG. 6). Of course, the radial position of the heads 12 with respect to the pipe 18 may be adjusted in the usual manner, with the clamping member 58 being utilized for securely retaining the heads 12 in the desired position.

The guide wheel 170 is disposed within the pipe joint 166 as shown in FIG. 1, and the positioning of the guide wheel 170 in the pipe joint automatically aligns the heads 12 with the pipe joint due to the connection between the guide wheel and the welding heads as hereinbefore set forth. Of course, the guide wheel 170 rides in the groove or pipe joint as the apparatus 10 revolves around the pipe 18, regardless of any deviation or irregularities of the plane of the pipe joint by virtue of the sliding connection of the base 22 with the carriage device 14. Thus, the welding heads 12 are maintained in substantial alignment with the pipe joint 166 as the apparatus 10 moves circumferentially around the pipe.

Each carriage 14 is propelled around the track 16 by actuation of the respective motor 264. Rotation of the drive shafts 268 of the motors 264 rotates the drive gears 280 and 282 for moving the gears 278 around the ring gear 288, thus moving the carriages 14 around the track 16. Of course, the speed of movement of the carriages 14 may be regulated by the speed of the motor 268, the ratio between the sprockets 270 and 272, and the ratio between the gears 280 and 282 and the ring gear 288, as is well known. The drive gears 280 and 282 are circumferentially spaced in such a manner that no drive connection or drive engagement is lost between that portion of the ring gear 288 in the vicinity of the severed portion or joints 290 and 292, thus assuring an efficient and even movement of the apparatus 10 around the pipe 18.

As hereinbefore set forth, one of the carriages 14 is disposed at the 0° position on the track 16, and the other of said carriages 14 is disposed on the track 16 at 270° in a clockwise direction with respect to the first carriage 14. The welding heads 12 of each carriage 14 perform substantially simultaneous and sequential welding operations at the joint 166, as will be hereinafter set forth in detail, as the carriages 14 move circumferentially around the pipe 18. At the initiation of the welding operation, the first carriage 14 is moved in a clockwise direction from the original 0° position through an arc of substantially 180°, thus welding substantially one half the circumference of the joint 166. Simultaneously, the second carriage 14 is moved in a counterclockwise direction from the original 270° position through an arc of substantially 90° thus welding approximately one fourth the circumference of the joint 166. The operation of the welding heads 12 of the second carriage 14 is then interrupted momentarily or for a relatively short time period, and the second carriage is very rapidly moved in a reverse or clockwise direction through an arc of approximately 180° and to the original 0° of the first carriage 14. The welding heads are then reactivated for continuing the welding operation, and the second carriage 14 is moved in a counterclockwise direction through an arc of approximately 90° to the original 270° position therefor. This results in the welding of the remaining one fourth of the circumference of the pipe joint 166.

It will be apparent that the combined welding operation of the two synchronized carriages reduces the time required for welding of the complete joint 166, and furthermore, the welding operation is accomplished in a balanced action, and in a manner eliminating a complete travel of any one device across the lower portion of the pipe joint. As the first carriage is welding the upper right hand quadrant of the pipe joint, the second carriage is simultaneously welding the lower left hand quadrant of the joint. Similarly, as the first carriage is welding the lower right hand quadrant of the pipe joint, the second carriage is welding the upper left hand quadrant thereof. The carriages complete the welding operations substantially simultaneously. Of course, the timing of the movement of the carriages, and the timing and reversal action of the second carriage in particular, may be accomplished by automatically regulating the actuation of the respective motors 264, in any well known manner (not shown).

As the carriage 14 moves circumferentially around the pipe 18, it will be readily apparent that the plurality of welding heads will traverse the path of the pipe joint 166 in sequential relationship, with one of the welding heads moving along the joint prior to the passage of the next succeeding welding heads. Thus, the first welding head, such as the welding head 12c initiates the welding operation, and applies the welding material in the apex of the groove or joint 116. The welding head 12c is adjusted for relatively small oscillatory movement in the longitudinal direction with respect to the pipe 18 for efficiently depositing the weld material in the relatively narrow portion of the pipe joint 166.

The actuation of the next succeeding welding head, such as the welding head 12b, is delayed slightly in order that the welding head 12b will be moved to a position substantially directly above the initial deposit of the weld material provided by the leading welding head 12c. The welding head 12b then deposits the welding material in the groove or joint 166 directly on top of the initial weld layer, and at a relatively small time interval subsequent thereto. The portion of the groove 166 receiving the weld material from the second welding head 12b is slightly wider than the apex portion initially receiving the welding material from the welding head 12c. Accordingly, the welding head 12b is adjusted for slightly greater oscillation in the longitudinal direction of the pipe 18, thus assuring an efficient second layer of welding in the groove 166.

The actuation of the next succeeding welding head, such as the welding head 12a, is delayed slightly with respect to the actuation of the welding head 12b whereby the welding action of the head 12a will commence substantially at the point of the initial welding of the first and second welding heads 12c and 12b, respectively. Of course, the welding head 12a will deposit the weld material on the material left by the previous welding head 12b, and the welding material from the welding head 12a will substantially fill or overfill the remaining portion of the groove or pipe joint 166. It will be apparent that the width of the groove at the outer or upper end thereof is greater than the width thereof encountered by the previous layers of welding material. Consequently, the welding head 12a will be adjusted for a slightly greater oscillation in the longitudinal direction of the pipe 18 for assuring an efficient completion operation for the welding of the joint 166.

Subsequent to the completion of the welding operation, the guide wheel 170 may be lifted from engagement with the outer periphery of the pipe and locked in the raised position by the locking pin 190, as hereinbefore set forth. In addition, the locking or latching means 146 may be utilized for locking the base 22 against sliding movement with respect to the carriage device 14, and the entire apparatus 10 may be rolled along the outer periphery of the pipe through the engagement of the rollers or wheels 320, 322, and 324 therewith. The apparatus 10 may be easily moved along the pipe to the site of the next succeeding pipe joint 166 to be welded whereupon the operation may be repeated.

The time delay between the initiation of the welding operation of each welding head has been found to produce extremely good results in the welding operation. The initially deposited layers of weld material will be permitted to begin to set up or harden, but will not have sufficient time to completely set up, and the application of the next succeeding layer of weld material results in a united pipe joint wherein substantially no holidays are present. A visual inspection, X-ray inspection, and other tests of welds accomplished in the manner of the present invention have proven the extremely excellent results possible with the novel method. Of course, it is also recognized that the overall excellent results of the welding operation are only possible if the ends of the adjacent pipe sections 18 are in substantially true cylindrical and axial alignment, which is brought about in the present instance by the clamping apparatus and method which will be hereinafter set forth in detail.

Whereas the particular embodiment of the welding apparatus 10 shown and described herein discloses the use of three welding heads 12 on each carriage 14, it is to be noted that excellent welding results have been obtained through the use of two welding heads on each carriage. In this instance, the first welding operation of the pipe joint 166 comprises the laying down of two superimposed layers of the welding material as hereinbefore set forth. The welding apparatus 10 may then be rolled along the outer periphery of the pipe, as hereinbefore set forth, for repeating the dual welding operation at the next succeeding pipe joint. Another apparatus 10 may be moved to the site of the partially complete welded joint, and either one or two more weld layers may be added to the joint in the manner as hereinbefore set forth.

CLAMPING APPARATUS

Referring now to FIGS. 14 through 21, an internal pipe clamping apparatus generally indicated at 340 is depicted which is adapted for rolling internally in a longitudinal direction within the pipe section 18 to a position or location in the proximity of the pipe joint 166 in a manner and for a purpose as will be hereinafter set forth. The clamping apparatus 340 comprises an expandable clamping and reforming section 342, an actuating section 344, and a propulsion section 346.

Figure 16:
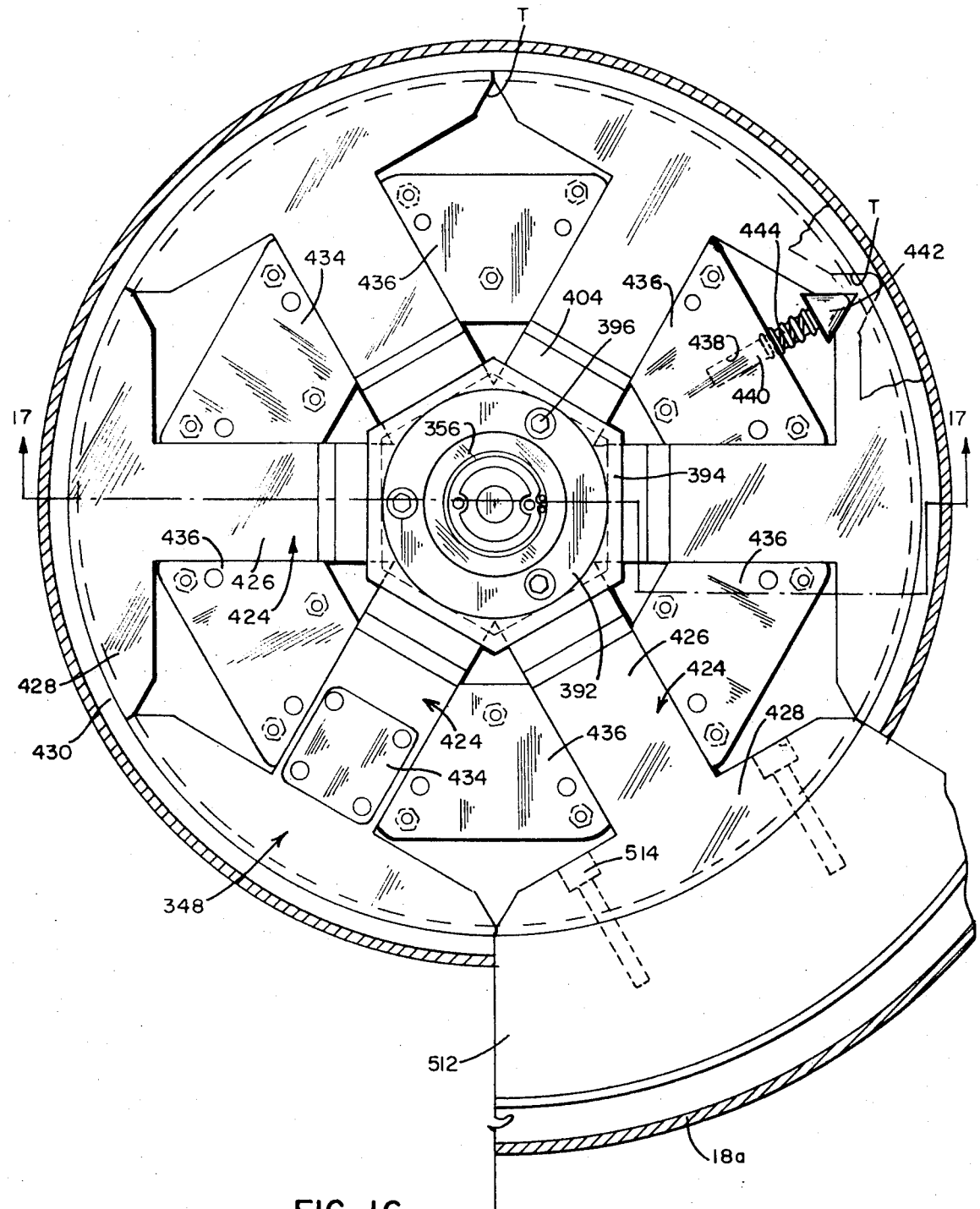
FIG. 16 is a composite transverse sectional view of a pipe section having the clamping mechanism disposed therein with the lower right hand portion of the figure depicting a clamp as modified for large diameter pipe sections.
Figure 17:
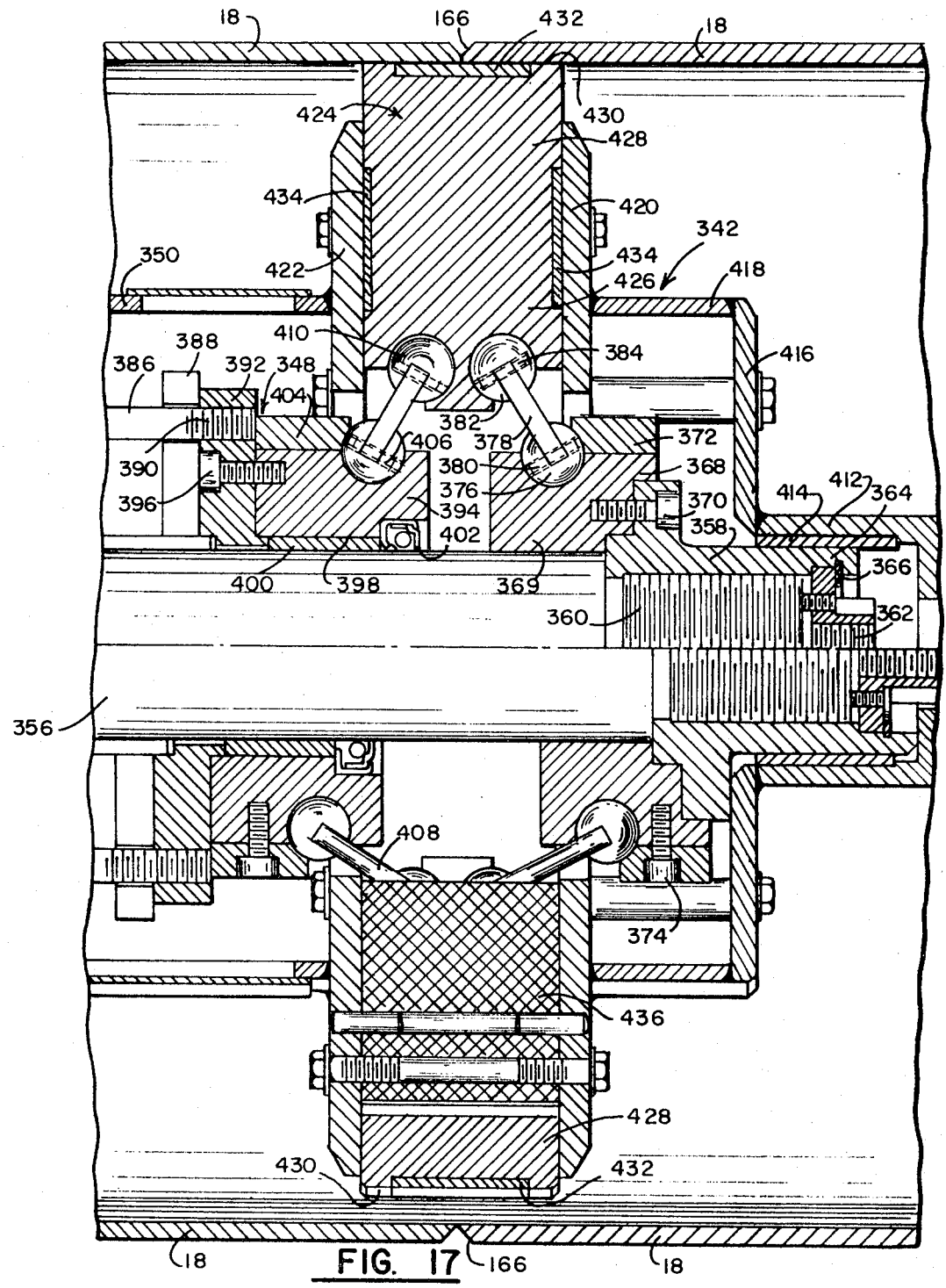
FIG. 17 is a sectional view taken on line 17—17 of FIG. 16 and depicting the clamping portion of the clamping apparatus disposed at the joint with the upper half of the figure depicting the clamp in a clamping position and the lower half of the figure depicting the clamp in a relaxed position.

As particularly shown in FIGS. 16 and 17, the clamping section 342 is adapted for disposition in the proximity of the pipe joint 166 prior to and during the welding operation, and is particularly disposed in such a manner as to span the pipe joint 166 as clearly shown in FIG. 17. The illustration in FIG. 17 is a composite sectional view of the clamping section 342 wherein the upper half of the drawing shows the apparatus 342 in an extended or clamping position, and the lower half of the figure depicts the apparatus 342 in a contracted or non-clamping position.

The clamping section comprises a suitable cylinder 348 supported within a housing 350 by means of a plate 352 having resilient or yieldable spacer member 354 secured around the outer periphery thereof and in engagement with the inner periphery of the housing 350. The cylinder 348 may be of any suitable type and as shown herein is a pneumatically actuated cylinder of the type known as Miller H-61. The cylinder 348 comprises a reciprocal piston rod 356 having a flanged sleeve 358 threadedly secured to the outer end thereof at 360. A reduced threaded stem portion 362 is provided on the outer extremity on the rod 356 and extends longitudinally therefrom for receiving a threaded block member 364 which may be retained thereon in any suitable manner such as by a lock washer 366. The flanged sleeve 358 is secured to a hexagonal hub member 368 in any suitable manner such as by the bolts 370. The hub 368 is provided with a central bore 369 extending longitudinally therethrough for disposition around the outer periphery of the piston rod 356. It will be apparent that reciprocal movement of the rod 356 is transmitted to the hub 368 through the connection of the flanged sleeve 358 therebetween. A toggle block 372 is secured around the outer periphery of the hub 368 by means of a plurality of circumferentially spaced bolts 374 or the like. A ball joint member 376 is suitably journalled on the toggle block 372 and the hub 368 and a link member 378 is pivotally secured at one end to a ball 376 by means of a roll pin 380 or the like. A second ball joint 382 is secured at the opposite end of the link 378 by means of a roller pin 384 for a purpose as will be hereinafter set forth.

The cylinder 348 is provided with a plurality of spaced and longitudinally extending rod members 386 which extend slidably through a flange member 388 keyed or otherwise secured around the outer periphery of the rod 356 and spaced from the threaded end 360 thereof. Each rod member 386 is threadedly secured at 390 to a flange member 392 which is slidably disposed around the outer periphery of the rod 356. A hexagonal hub member 394 similar to the hub 386 is secured to the movable flange 392 in any suitable manner such as by a plurality of bolts 396. A central bore 398 extends through the hub 394 for receiving a bushing sleeve 400 therein and the bushing 400 is slidably disposed on the outer periphery of the rod 356. The bushing 400 may be retained in position by means of a suitable seal member 402 interposed between the hub 394 and the piston rod 356. It will be apparent that the hub 394 is longitudinally movable independently with respect to the rod 356. A toggle block 404 is disposed around the outer periphery of the hub 394 and a ball joint 406 similar to the ball 376 is journalled on the toggle block 404 and the hub 394 for securing a link arm 408 in a manner similar to the link 378. A ball joint 410 is pivotally secured to the outer end of the link 408 in a similar manner as the ball joint 382 for a purpose as will be hereinafter set forth.

The outer periphery of each of the hub members 368 and 394 is preferably hexagonal. A toggle link 378 is secured to each flat surface of the hexagonal configuration of the outer periphery of the hub 368. Similarly, a toggle link member 408 is secured to each of the flat surfaces of the hexagonal configuration of the outer periphery of the hub 394.

An end cap member 412 is disposed around the outer periphery of the flanged sleeve 358 and a bushing sleeve 414 is interposed therebetween whereby the flanged sleeve 358 is slidable within the end cap 412. An annular plate member 416 is welded or otherwise secured to the cap member 412 and a cylindrical cover portion 418 is welded or otherwise rigidly secured around the outer periphery of the plate 416. The cylinder 418 extends in a direction away from the end cap member 412 and a second annular plate 420 is rigidly secured to the outer end thereof, thus providing a complete unitary cover member for the outer end of the clamping section 342. An annular plate or shell 422 complementary to or similar to the plate 420 is secured to one end of the housing 350 and longitudinally spaced from the plate 420 to provide an annular chamber therebetween for a purpose as will be hereinafter set forth.

A plurality of T-shaped expandable clamping segments 424 are slidably interposed between the spaced plates 420 and 422, with one of the segments 424 being provided for each of the flat surfaces of the complementary or corresponding hexagonal hubs 368 and 394. (Of course, whereas it is found preferable to provide six-sided or hexagonal hub members for the clamping section 342, it is to be understood that the outer periphery of the hub members may be of substantially any desired configuration, and are not limited to the hexagonal configuration depicted herein. Each segment 424 comprises a stem portion 426 (FIG. 16) having an enlarged segment 428 provided at the outer end thereof. The outer edge 430 of the enlarged segment 428 is arcuate whereby a circle is defined by the aligned edges 430 of the combined segments 428, as will be hereinafter set forth. An insert member 432 is provided along the edge 430 of each segment 428 and centrally disposed therein as particularly shown in FIG. 17. The inserts 432 are preferably constructed of an extremely hard material and spans the joint 166 during a clamping and welding operation to provide a back up plate, as is well known.

The opposed surfaces or faces of the stem portions 426 of each T-segment 424 is provided with an insert 434 which is preferably constructed from a suitable bearing material, such as Garlock "du" high performance lubrication-free bearing material, for facilitating the reciprocal movement of the T-segments 424 between the plates 420 and 422 as will be hereinafter set forth. The inner end of each stem 426 is disposed in the proximity of one of the flat surfaces of the outer periphery of the hubs 368 and 394 and spans the longitudinal distance between the hubs, as clearly shown in FIG. 17. The inner end of each stem 426 is suitably secured to the ball joints 384 and 410 whereby each segment 424 is connected with the respective flat surface of the hubs 368 and 394 by the toggle links 378 and 408. It will be readily apparent that relative longitudinal movement between the hubs 368 and 394 will cause reciprocation of the segments 424 between the plates 420 and 422, for a purpose as will be hereinafter set forth.

A substantially wedge shaped segment guide plate 436 is interposed between each adjacent pair of segments 424 and may be bolted or otherwise secured between the plates 420 and 422. Each guide plate 436 is provided with a bore 438 for slidably receiving a rod 440 therein having a seal bar member 442 provided on the outer end thereof. A helical spring 444 is disposed around the rod 440 and suitably anchored between the guide plate 436 and the seal bar or head member 442 for constantly urging the bar 442 in a radially outward direction for a purpose as will be hereinafter set forth. (Only one of the slide bar members 442 and associated rod 440 and spring 444 are shown in FIG. 16 for purposes of clarity. In addition, only one of the bearing plates 436 is shown in FIG. 16 in order to preclude confusion in the drawing.)

In the normal position of the cylinder 348, the piston rod 356 and rods 386 are in the position shown in the lower half of FIG. 17. In this position, the hubs 368 and 394 are spaced apart a sufficiently great distance that the link members 378 and 408 are extended in a manner for pulling the segments 424 in a radially inward direction. This maintains the segments 424 in a contract position, or out of engagement with the inner periphery of the pipe 18. When the clamping section 342 has been positioned within the pipe 18 in such a manner that the segments 424 span the pipe joint 166, air or actuation fluid may be applied to the cylinder 348 in the usual manner. Upon the application of fluid pressure to the cylinder 348, the piston 356 is moved in a left hand direction as viewed in FIG. 17, and the rods 386 are simultaneously moved in a right hand direction. (The plate 352 moves simultaneously with the rods 386 and slide within the housing 350 through the slidable members 354.) This movement of the piston 356 and rods 386 moves the hubs 368 and 394 in a direction toward each other and to the position shown in the upper half of FIG. 17. This causes the toggle links 384 and 408 to move outwardly for sliding the segments 424 in a radially outward direction and into engagement with the inner periphery of the pipe sections 18. The size of the structure of the clamping section 342 and the force of the actuating pressure are extremely great. As a result, the back up member 432 transmits a great radially outward pressure on the abutting ends of the pipe sections 18 at the pipe joint 166. In the expanded or extended position of the segments 424, the arcuate edges 430 thereof will be disposed in end to end relation and in circular alignment, and as hereinbefore set forth, the combined arcuate edges 430 define a circle. The extreme radial outward force of the segments 424 against the inner periphery of the pipe ends reforms the pipe ends into substantially exact circular configuration, and since the pipe ends are simultaneously reformed by a common reforming device, the abutting ends will be reformed to a substantially exactly similar configuration. In addition, the pressure of the segments 424 against the pipe joint 166 securely retains the pipe sections 18 in position during the welding operation.

It will be readily apparent that the resultant welding operation can be performed efficiently only if the pipe joint 166 to be welded is a "good" pipe joint. The overall results obtained with the welding apparatus 10 are extremely excellent, due largely to the fact that the clamping section 342 performs an efficient reforming and clamping of the abutting pipe ends, and thus, the coaction of the clamping and welding apparatus is important in the overall end result.

The actuating section 344 includes an intensifier device 450 which may be of any suitable type, and as shown herein is the type known as a Miller A53–84 Booster. In addition, a suitable pneumatic cylinder 452, or the like, is provided in the actuator section 340 having at least one expandable and contractable piston 454 extending outwardly therefrom. The cylinder 452 may be suitably connected with a fluid supply source 456 and is so arranged that the piston 454 is immediately expanded into a clamping position against the inner periphery of the pipe section 18 when the clamping segments 424 are extended. The piston 454 facilitates clamping of the entire clamping apparatus 340 within the pipe section during a clamping and welding operation.

Figure 14:
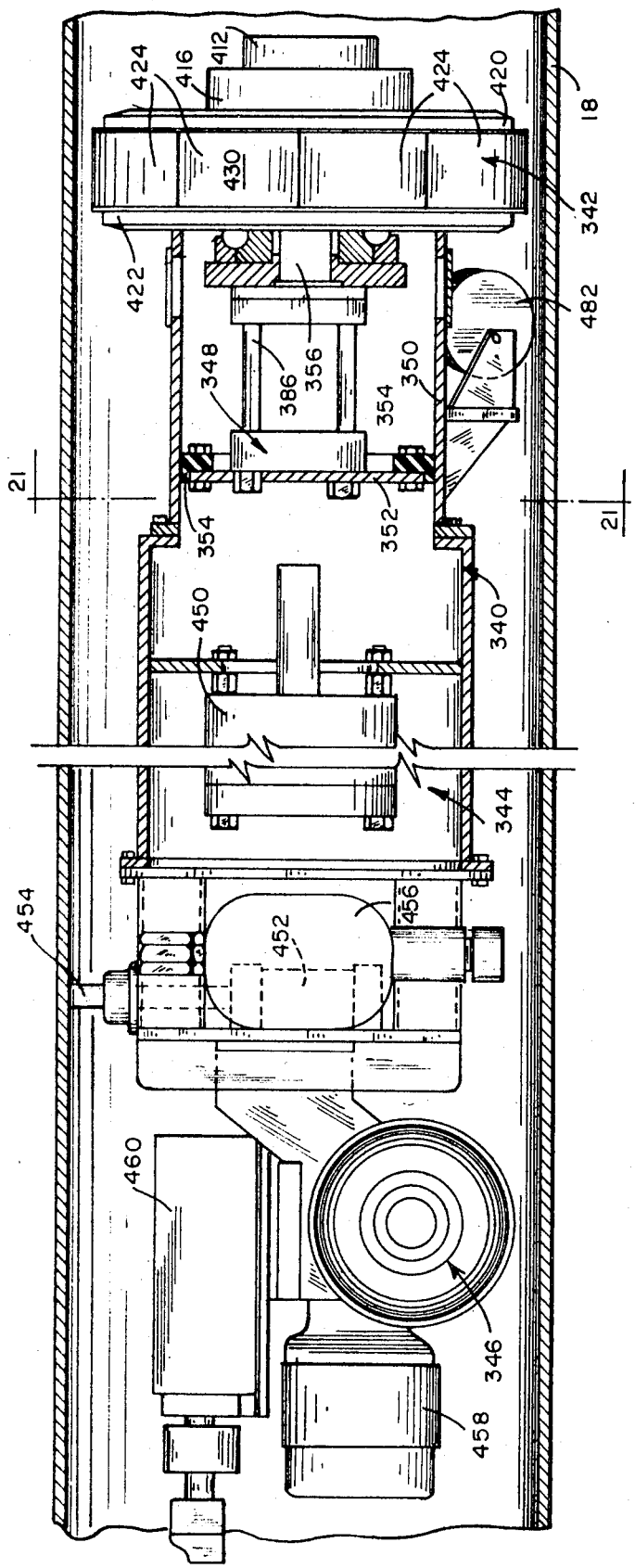
FIG. 14 is a sectional elevational view of a pipe section having an internal clamping apparatus member the invention disposed therein.
Figure 15:
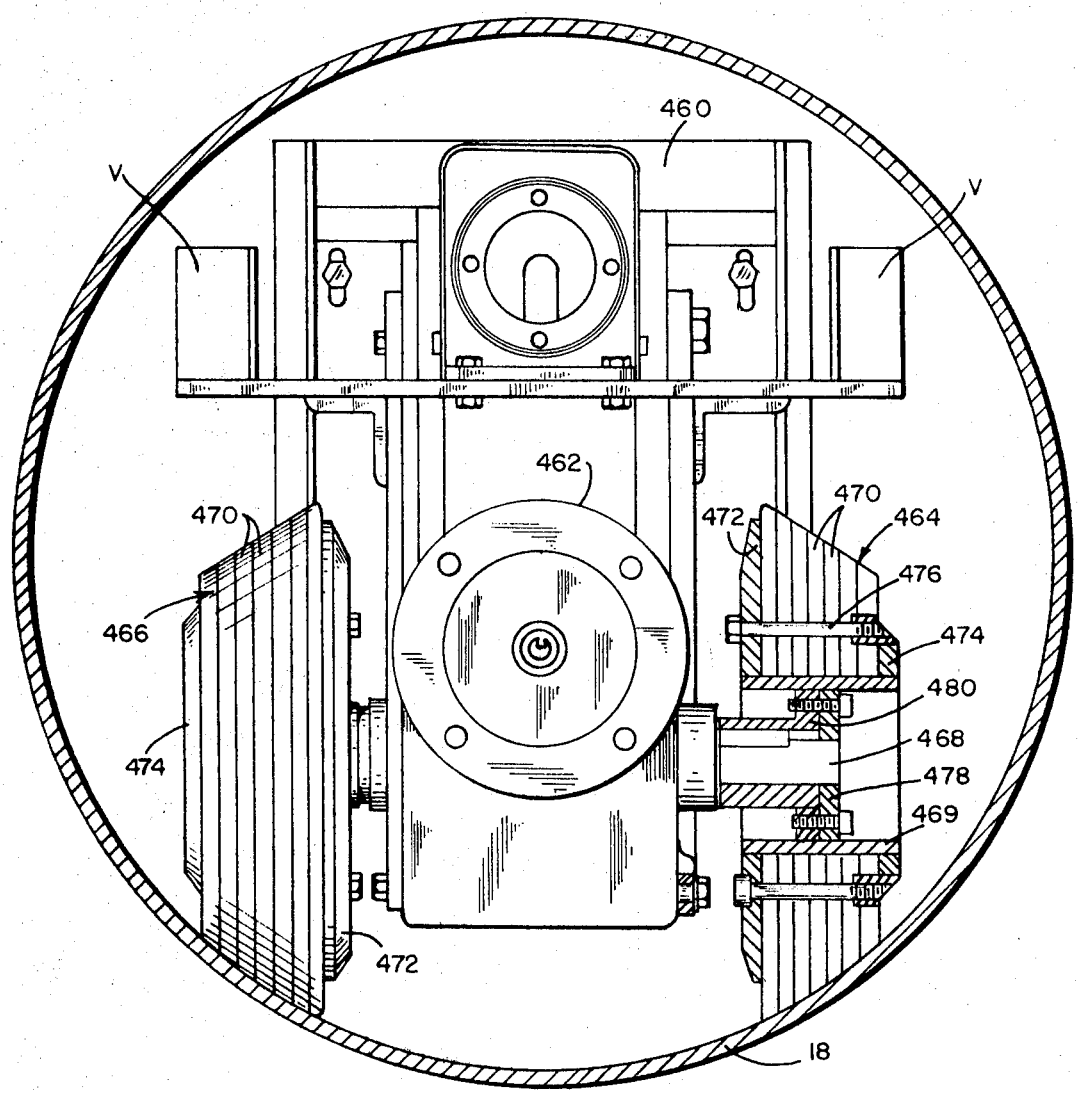
FIG. 15 is a transverse sectional view of a pipe section having an internal clamping apparatus member the invention disposed therein.

The propulsion section 346 includes a suitable power source or motor 458 rearwardly or at the left hand end of the housing 350 as viewed in FIG. 14. In addition, a suitable slip ring assembly 460 and a speed reduced 462 are secured in association with the motor 458 in any well known manner. A pair of oppositely disposed wheels generally indicated at 464 are secured to the outer ends of a gear reducer output shaft 468 for rotation thereby. The wheels 464 and 466 engage the inner periphery of the cylindrical pipe 18 for propelling the apparatus 340 longitudinally within the pipe 18.

Each of the wheels 464 and 466 are of a substantially identical construction and comprise a central sleeve 469 having a plurality of annular fabric discs 470 secured in side by side relation around the outer periphery thereof. The outer peripheries of the discs 470 are in graduated sizes, as clearly shown in FIG. 15. The outer edges of the discs 470 are particularly graded or sized whereby the composite outer periphery formed for the wheels 464 and 466 are of a configuration complementary with the transverse configuration of the inner periphery of the pipe 18. The plurality of discs 470 are held securely together by an annular clamp ring 472 and an outer rim member 474 and cooperating bolts 476 which extend through the plate 472, discs 470 and the rim 474. The discs 470 may be secured to the outer periphery of the sleeve 469 in any suitable manner (not shown) for rotation simultaneously therewith, and the sleeve 469 is provided with an inwardly directed annular flange 478 bolted or otherwise secured to the hub 480 of the gear reducer output shaft 468. The frictional engagement of the discs 470 with the inner periphery of the pipe 18 upon rotation of the wheels 464 and 466 drives the apparatus 340 longitudinally through the pipe 18.

Figure 18:
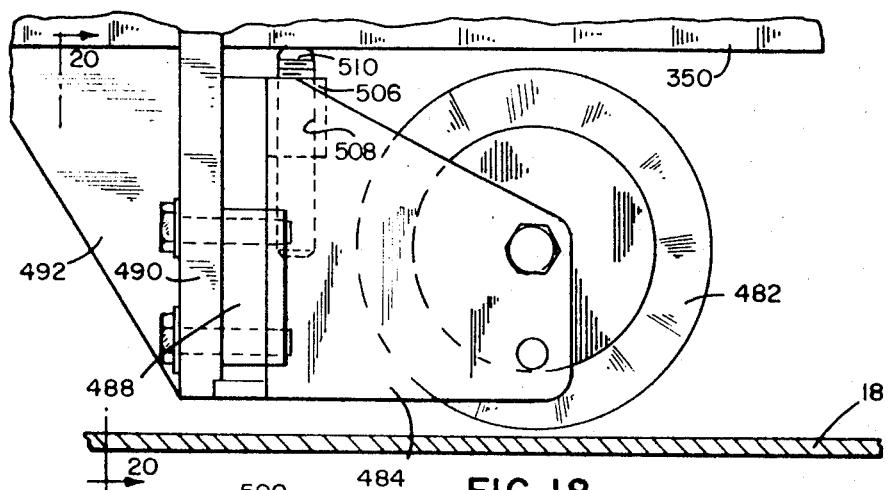
FIG. 18 is a side elevational view of a roller member of the clamping apparatus for propelling the clamping apparatus through the interior of the pipe.
Figure 19:
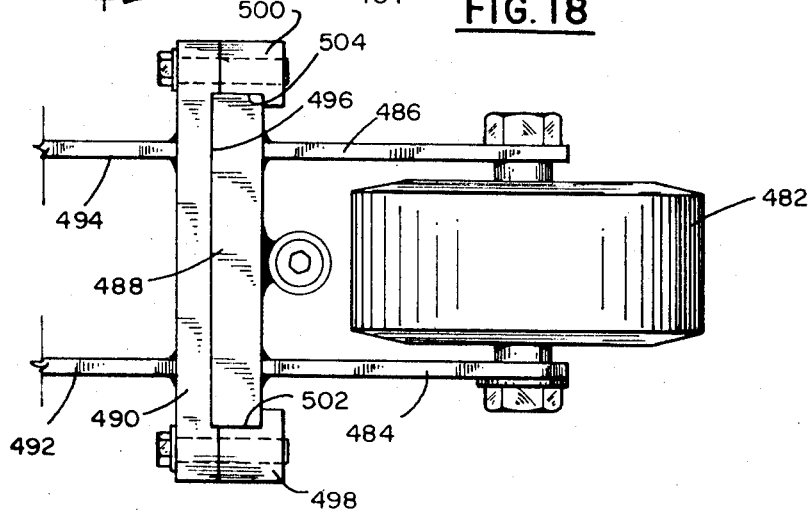
FIG. 19 is a plan view of the roller depicted in FIG. 18.
Figure 20:
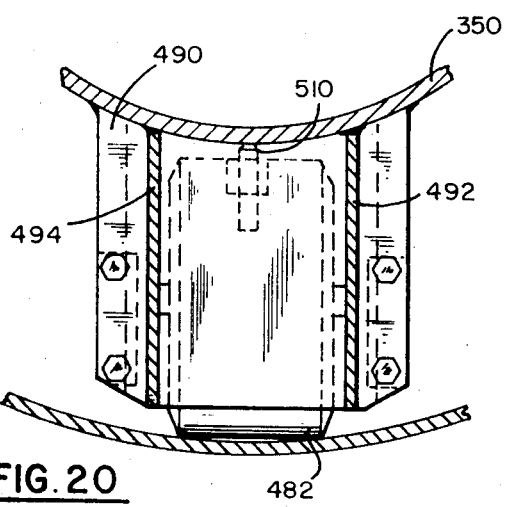
FIG. 20 is a view taken on line 20—20 of FIG. 18.
Figure 21:
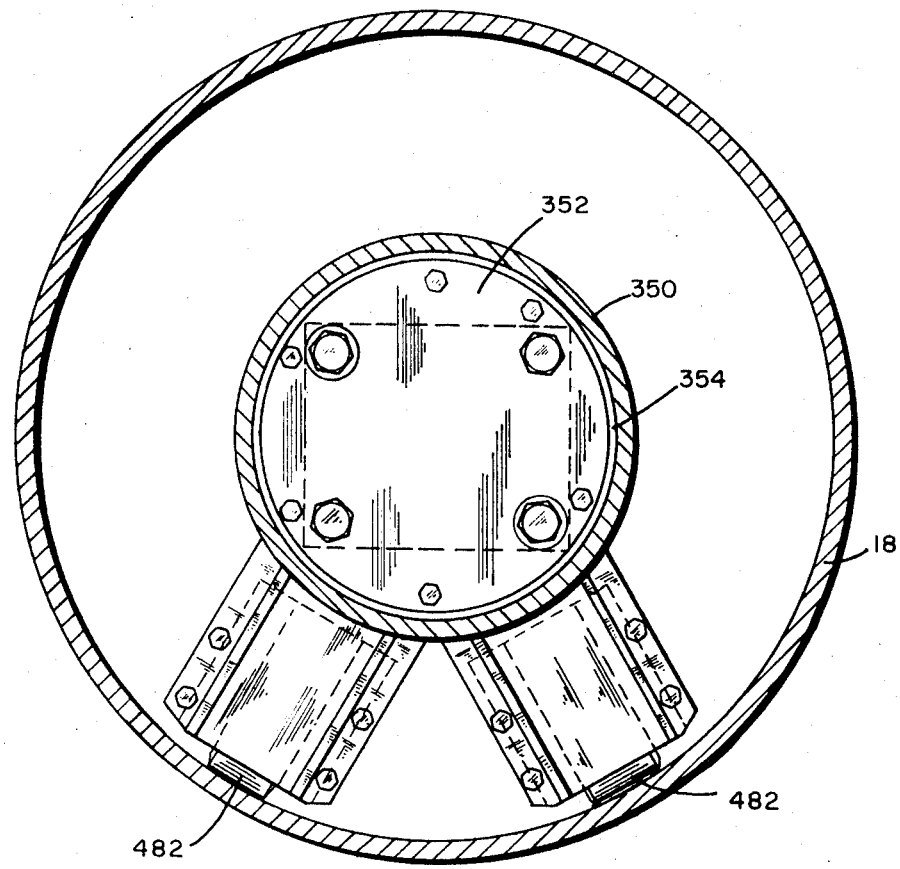
FIG. 21 is a sectional view taken on line 21—21 of FIG. 14.

In addition, a plurality of rollers or wheels 482 are mounted forwardly on the housing 350 or in the proximity of the clamping section 342 as particularly shown in FIG. 14. Each wheel 482 is suitably journalled between a pair of spaced side plates 484 and 486 (FIGS. 18 through 20). The plates 484 and 486 are welded or otherwise rigidly secured to a support plate 488 and extend substantially perpendicularly outward therefrom. The plate 488 is slidably secured to a support bracket 490 which is rigidly secured to the outer periphery of the housing 350 in any suitable manner, such as by a pair of spaced support webs 492 and 494. Whereas the plate 488 may be slidably secured to the bracket 490 in any well known manner, as shown herein a recess 496 is provided in the outer face of the bracket 490 for slidably receiving the plate 488 therein. A pair of spaced oppositely disposed clamp bars 498 and 500 are bolted or otherwise secured to the bracket 490 and each bar 498 and 500 is provided with a recess 502 and 504, respectively, for receiving the side edge of the plate 488 therein to guide the reciprocal movement of the plate 488. A boss 506 is secured to the outer or exposed face of the plate 488 and is provided with a threaded aperture 508 for receiving a threaded stud 510 therethrough. The outer end of the stud 510 bears against the outer periphery of the housing 350 as clearly shown in FIGS. 18 and 20, and it will be apparent that rotation of the stud 510 in one direction will cause the plate 488 to move in a direction toward the housing 350 and rotation of the stud 510 in an opposite direction will cause the plate 488 to move in a direction away from the housing 350. Thus, the position of the wheels 482 may be adjusted as required for placing the wheels in contact or in engagement with the inner periphery of the pipe 18. The wheels 482 cooperate with the drive wheels 464 and 466 for moving the apparatus 340 longitudinally within the pipe 18.

Whereas the overall dimensions of the clamping apparatus 342, and particularly the segments 424 are such that a single device may be utilized within pipe sections of several diameters, it is recognized that some pipe sections are of extremely great internal diameters. When the diameter of the pipe section is greater than the outer limit of the extended segments 342, the segments may be altered by securing an arcuate bar 512 (FIG. 16) to the arcuate surface 430 thereof. The bars 512 may be secured to the respective T-segment 424 by a plurality of bolts 514, and function to effectively increase the length of the T-segments whereby the arcuate bars 512 will be brought into a clamping and reforming pressure engagement against the inner periphery of the large pipe section 18a upon expansion of the clamping segments. Of course, the bars 512 may be provided with back-up inserts (not shown) similar to the inserts 432 for facilitating the welding operation.

FIG. 22 is a schematic view of a pair of abutting pipe sections having a welding apparatus 10 and clamping apparatus 340 disposed in position at the pipe joint 166. The internal clamping apparatus 340 may be moved longitudinally through the pipe 18 by means of the propulsion of the wheels 464 and 466 upon actuation of the motor 458, and the apparatus 340 may be positioned within the pipe in such a manner that the clamping segments 424 are disposed in substantial alignment with the pipe joint 166, as shown in FIG. 22.

The clamping segments 424 are in a normally retracted position as the apparatus 340 traverses the interior of the pipe. When the apparatus 340 is at the desired position, the fluid system (not shown) of the apparatus 340 is actuated in the normal or well known manner whereby the toggles 378 and 408 move the T-segments or clamping segments 424 radially outwardly into a clamping and reforming engagement with the pipe ends at the pipe joint 166. This action reforms the pipe ends simultaneously into a substantially circular configuration, and closely aligns the abutting pipe ends in a longitudinal and circular direction. As long as the segments 424 are retained in the radial outward or clamping position, the pipe ends at the joint 166 are securely held or clamped against relative movement.

The welding apparatus 10 may be moved or rolled along the outer periphery of the pipe 18 and into the proximity of the pipe joint 166. The guide wheel 170 may be adjusted as hereinbefore set forth for disposition within the groove 166, and the welding heads 12 may be adjusted for the desired oscillation and angular position thereof. As hereinbefore set forth, it is preferable to provide two sets of the welding heads 12 circumferentially spaced on the ring 16 for facilitating the overall welding operation.

With the pipe joint efficiently clamped and the welding apparatus 10 in place at the pipe joint and properly adjusted, the motor 264 of each welding head assembly is actuated in the usual manner, and the welding operation may be initiated. The two sets of welding heads circle the pipe joint simultaneously to perform a girth welding operation. The first of the welding head assemblies moves in one circumferential direction around the pipe from a position of 0° to a position of approximately 180°. The second set of welding heads moves in an opposite circumferential direction from a position of 270° to a position of approximately 180° in substantially one-half the time required for the entire movement of the first welding head assembly, with both welding head assemblies performing a sequential, multilayer welding operation as hereinbefore set forth. The welding operation of the second welding head assembly is interrupted when the second welding head assembly reaches the 180° position, and the entire second welding head assembly reverses its direction and very rapidly moves to a 0° position on the track 16. The welding operation of the second welding head assembly is then resumed as the second welding head again reverses its direction of circumferential movement around the pipe and moves from the 0° position to the initial 270° position thereof. Thus, the entire pipe joint 166 is welded in a relatively short time, and through a balanced operation of the two welding head assemblies.

Subsequent to the welding operation, the welding apparatus 10 may be prepared for movement along the outer periphery of the pipe and rolled longitudinally therealong to the site of the next pipe joint 166 to be welded. The clamping segments 424 may be retracted to the non-engaged position with respect to the inner periphery of the pipe, and the propulsion wheels 464 and 466 may be rotated for moving the clamping apparatus longitudinally through the pipe and to the site of the next succeeding pipe joint to be welded where the entire clamping and welding operation may be repeated.

It is to be noted that the outer edges of each T-segment or clamping segment 424 are tapered as shown at T in FIG. 16 whereby the spring loaded seal bar 442 interposed between each adjacent pair of segments 424 may ride outwardly in the wedge-shaped spacing provided between the segments and constantly urge the segment edges in a radially outward direction. In addition, suitable air valves V (FIG. 15) are provided on the clamping apparatus 340 for facilitating the function of the fluid system of the clamping apparatus.

From the foregoing it will be apparent that the present invention provides a novel method and means of performing a girth welding operation at a pipe joint. The novel method and means includes reforming of adjacent or abutting pipe ends and clamping the reformed pipe ends in aligned end to end relation. A welding apparatus is then moved circumferentially around the outer periphery of the pipe at the pipe joint wherein a plurality of welding heads simultaneously perform a sequential girth welding operation. The welding apparatus is moved around the outer periphery of the pipe in such a manner as to provide a balanced welding operation at the pipe joint at the pipe installation site thereof. The combination of the excellent reforming and clamping of the abutting pipe ends and the balanced sequential girth welding provide a completed weld at the joint of an excellence not heretofore possible under these conditions. The clamping and welding apparatus may both be moved longitudinally with respect to the pipe from pipe joint to pipe joint to efficiently join a pipe of substantially great length in a manner which is simple and economical.

Whereas the present invention has been described in particular relation to the drawings attached hereto, it should be understood that other and further modifications, apart from those shown or suggested herein, may be made within the spirit and scope of this invention.

What is claimed is:

1. A pipe welding apparatus comprising annular track means concentrically disposed around a pipe section and radially spaced from the outer periphery thereof, carriage means movably secured to the track means for moving the carriage means circumferentially around the outer periphery of the pipe section, support means adjustably secured to the carriage means and movable simultaneously therewith around the outer periphery of the pipe section, multiple welding head means adjustably secured to the support means and movable simultaneously therewith around the outer periphery of the pipe section with each welding head following the preceeding welding head, guide means cooperating between the support means and multiple welding head means for maintaining each welding head of the multiple welding head means in substantial alignment with the pipe joint during movement thereof around the pipe section, means provided on the multiple welding head means for independent adjustment of the radial position of each welding head with respect to the pipe, oscillating means cooperating with the multiple welding head means for selective oscillation of each welding head in a direction substantially perpendicular to the plane of the pipe joint during a welding operation whereby a complete welding operation is performed upon a single pass of the multiple welding head means, actuating means operably connected with the multiple welding head means for providing a simultaneous sequential welding operation of the welding heads during a welding operation, and saddle means secured to the track means and having one position for securing the track means around the pipe section in a manner precluding movement of the track means and having a second position permitting longitudinal movement of the track means along the outer periphery of the pipe section.

2. A pipe welding apparatus as set forth in claim 1 wherein the guide means includes a guide wheel rotatably secured to the support structure and engagable with the pipe joint during movement of the support apparatus around the pipe section, yieldable means connected between the support apparatus and the guide wheel for constantly urging the wheel into engagement with the pipe joint, and slide means cooperating between the guide wheel and welding head means for maintaining the guide wheel and welding head means in alignment with the pipe joint during movement of the support apparatus around the pipe section.

3. A pipe welding apparatus as set forth in claim 2 and including locking means cooperating with the support structure and guide wheel for locking the guide wheel out of engagement with the pipe joint during the longitudinal movement of the track means along the outer periphery of the pipe section.

4. A pipe welding apparatus as set forth in claim 1 wherein the track means comprises a sectional annular support member having the inner periphery thereof larger than the outer periphery of the pipe section, hinge means connecting the support member sections together in said annular configuration, said hinge means providing alternate open positions and closed positions of the support member for facilitating transverse installation and removal of the track means with respect to the pipe section, a pair of concentrically disposed longitudinally extending cylindrical flanges provided on the support member to provide a track for receiving the carriage means, and ring gear means provided on the support member for cooperation with the drive means to provide said circumferential movement of the carriage means around the track means.

5. A pipe welding apparatus as set forth in claim 4 wherein the carriage means comprises a support body member, first roller means adjustably secured to the support body member for engagement with one of said cylindrical flanges during movement of the carriage means around the track means, second roller means adjustably secured to the support body member for engagement with the other of said cylindrical flanges during movement of the carriage means around the track means, said first and second roller means cooperating with said cylindrical flanges for facilitating the circumferential movement of the carriage around the track means and for retaining the carriage means on the track means.

6. A pipe welding apparatus as set forth in claim 1 wherein the carriage means comprises a support body member, and roller members adjustably secured to the support body member for engagement with the track means to facilitate circumferential movement of the carriage means around the track means.

7. A pipe welding apparatus as set forth in claim 1 wherein the multiple welding head means comprises a plurality of welding heads independently mounted on the support means, angle adjusting means cooperating between the support means and the welding heads for independent adjustment of the radially extending angular position of each welding head with respect to the outer periphery of the pipe section, longitudinal adjusting means cooperating between the support means and the welding heads for independent adjustment of the longitudinal position of each welding head with respect to the pipe section for alignment of each welding head with the pipe joint, and oscillating means cooperating between the support means and welding heads for providing independent oscillation of each welding head in a direction substantially perpendicular with respect to the plane of the pipe joint.

8. A pipe welding apparatus as set forth in claim 7 wherein the welding heads are disposed in substantial mutual linear alignment and in substantial linear alignment with the pipe joint for simultaneous and sequential welding of the pipe joint.

* * * * *